United States Patent [19]
Titmuss et al.

[11] Patent Number: 6,167,122
[45] Date of Patent: Dec. 26, 2000

[54] TELECOMMUNICATIONS ROUTING BASED ON FORMAT OF MESSAGE

[75] Inventors: Richard J Titmuss; Christopher S Winter, both of Ipswich, United Kingdom

[73] Assignee: British Telecommunications public limited company, London, United Kingdom

[21] Appl. No.: 09/065,053

[22] PCT Filed: Mar. 27, 1997

[86] PCT No.: PCT/GB97/00890

§ 371 Date: Apr. 28, 1998

§ 102(e) Date: Apr. 28, 1998

[87] PCT Pub. No.: WO97/37500

PCT Pub. Date: Oct. 9, 1997

[30] Foreign Application Priority Data

Mar. 29, 1996 [GB] United Kingdom .................... 9606739

[51] Int. Cl.[7] .................................................. H04M 11/00
[52] U.S. Cl. .................................... 379/93.15; 379/90.01; 379/93.01; 455/461
[58] Field of Search .................................... 379/38, 90.01, 379/93.01, 93.05–93.11, 93.14, 93.15, 93.26–93.32, 93.34, 93.37, 201, 211, 212; 455/461

[56] References Cited

U.S. PATENT DOCUMENTS

| | | |
|---|---|---|
| 4,658,416 | 4/1987 | Tanaka . |
| 5,315,636 | 5/1994 | Patel ........................................ 455/461 |
| 5,490,203 | 2/1996 | Jain et al. . |
| 5,657,377 | 8/1997 | Pinard et al. ......................... 379/93.02 |

FOREIGN PATENT DOCUMENTS

| | | |
|---|---|---|
| WO 91 11874 | 8/1991 | WIPO . |
| WO 94 27441 | 11/1994 | WIPO . |
| WO 95 08882 | 3/1995 | WIPO . |
| WO 95 26114 | 9/1995 | WIPO . |
| WO 96 09714 | 3/1996 | WIPO . |

OTHER PUBLICATIONS

Annual Review of Communications, vol. 48, 1994–1995, Chicago US, pp. 584–590, XP000543207 Smith: "Personal intelligent communications—Users in control" see p. 586, left–hand col., paragraph 5—p. 587, left–hand col. paragraph 2; figures 2,3 see p. 589, left–hand col., paragraph 5—right–hand col., paragraph 5.

International Switching Symposium, vol. 1, Oct. 25, 1992, Yokohama JP, pp. 302–306, XP000337663 Schwarta: A Personal Communications Services prototype using the Advanced Intelligent Network: see p. 303, left–hand col., paragraph 6—p. 306, right–hand col., line 1.

16th German Conference on Artificial Intelligence, Aug. 1992, Bonn DE, pp. 299–312, XP000602937 Lenting et al.: "Delegated negotiation for resource re–allocation" see p. 299, last paragraph—p. 300, last paragraph see p. 303, paragraph 2—p. 305, paragraph 1; table 1.

BT Technology Journal, vol. 13, No. 2, Apr. 1995, Ipswich GB, pp. 132–142, XP000500765 Marshall et al.: The information services supermarket—An information network prototype: see p. 135, right–hand col., line 6—p. 136, right–hand col. line 13; figure 1 see p. 140, right–hand col., paragraph 2—p. 141, left–hand col., paragraph 1; table 2.

Eleventh International Conference: Expert Systems and their Applications, May 27, 1991, Nanterre FR, pp. 81–94, XP002014041 Laasri et al.: An analysis of negotiation & its role for coordinating distributed problem solvers: see p. 82, line 1—p. 84, line 34.

(List continued on next page.)

Primary Examiner—Wing Fu Chan
Attorney, Agent, or Firm—Nixon & Vanderhye P.C.

[57] ABSTRACT

A telecommunications apparatus includes selecting and routing a signal destined for a user to one of a plurality of different terminals near to the user and operating in accordance with different signal formats, in dependence upon the format of said signal.

34 Claims, 14 Drawing Sheets

OTHER PUBLICATIONS

International Switching Symposium, vol. 6, May 28, 1990, Stockholm SE, pp. 155–160, XP000130978 Skubic.: Service management architecture: see p. 157, right–hand col., line 1—p. 160, left–hand col., line 17; figures 3,5,7.

IEEE Global Telecommunications Conference, vol. 3, Dec. 2, 1991, Phoenix US, pp. 1651–1655, XP000313681 Krupp: Engineering service negotiation and management functionality for the Advanced Intelligent Network: An application of object–oriented technology: see p. 1653, line 43—p. 1655, lien 28; figures 1,2.

Ericsson Review, vol. 70, No. 4, 1993, Stockholm SE, pp. 156–171, XP000415352 Söderberg: "Evolving an intelligent architecture for personal telecommunication"/.

TELECOMMUNICATIONS ROUTING BASED ON FORMAT OF MESSAGE

BACKGROUND OF THE INVENTION

1. Field of the Invention

This invention relates to telecommunications apparatus and methods. More particularly, this invention relates to apparatus and methods for transmitting signal (specifically signals with information or a data content) in multiple different formats.

The formats may simply be alternative technical representations of the same information; for example, different graphics formats. Alternatively, each format may be in a different medium; for example, image, text and audio formats. Further, the formats may represent something of the same information content but using different volumes of data; for example, a text file and a facsimile image made up of the characters of the text represent different formats for the same text information.

2. Related Art

In conventional telecommunications, a given user is associated with a given telecommunications terminal (e.g. a conventional telephone, or a computer with a modem, or a facsimile unit). However, more recently, users have become mobile. In addition to mobile telephones (for example digital cellular telephones such as those conforming to the GSM standard) other types of portable terminals include pagers (either tone pagers or message pagers which can receive short textual messages and display them); so called "personal digital assistants" (PDA's) and portable facsimile or computer units adapted to communicate via cellular networks using dedicated modems.

At the same time, the volume of different types of formats within which information can be transmitted is increasing, and new, so called "multi-media" formats, consisting of single sets of information presented in multiple media (such as for example image, text and audio files) are entering use.

The telecommunications channels through which information is delivered comprise channels of varying bandwidth, including optical fibre links; coaxial copper links; conventional subscriber telephone lines; infra-red local area networks; and radio transmission channels. Of these, radio frequency channels are used for mobile communications. However, radio frequency channels generally have available the lowest bandwidth due to demands on the RF spectrum and to the channel conditions within the RF spectrum.

It is becoming increasingly common for large organisations to provide local area networks within a building or group of buildings, at which a number of different terminals of different types are provided. For example, powerful workstations such as Sun (TM) workstations, may be connected on the same network as less powerful personal computers, advanced telephones, and conventional telephones. Depending on the access conditions, different users may have access to a number of different terminals within such a network, each with different capabilities of receiving information in different formats.

Various prior proposals have been made to attempt to meet the needs of mobile users dealing with data in different formats. For example, our earlier application WO 95/30317 (agents ref: A24847 WO) describes an "agent based" telecommunications system in which the position of a mobile user is tracked and, when he is in a cell which permits only low bandwidth information transfer, the incoming signal is either cached for later retrieval or the link is down graded (e.g. from video to voice).

Similarly, the article "The network with smarts, new agent—based WANs presage the future of connected computing", Andy Reinhardt, BYTE October 1994, pages 51–64, describes the proposed IBM 'Intelligent Communications' service (apparently intended to be marketed in late 1995) which allows a user to set up a routing profile so that when a fax is received for the user it may be converted to text using optical character recognition, and then converted to speech and read into a voice mailbox.

Our earlier application WO 95/15635 (agents ref: A24682 WO), describes an agent based telecommunications system for use in a multiple services network.

Our earlier application WO 96/25012, filed 7 Feb. 1996 (agents ref: A24966) describes a multimedia telecommunications system employing reconfigurable agents. Aspects of this document are incorporated by reference herein.

SUMMARY OF THE INVENTION

U.S. Pat. No. 5,446,553 (Motorola) discloses a fax messaging system in which, when a user is unavailable, incoming messages are stored for later access.

The present invention provides a telecommunication system in which, as in some of the above proposals, a user is tracked, and the identity of a terminal which he may at any time be using is stored. Further, the present invention provides, in one aspect, storage of the capabilities (i.e. formats in which signals can be accepted and/or output) of terminal equipment in the vicinity of the user.

Therefore, rather than attempting (unsuccessfully) to deliver a high bandwidth signal to a low bandwidth mobile terminal, the system of the present invention directs the signal to a nearby terminal which can support a better representation of the signal. The nearby terminal may accept and output the signal in its original form, or the network may convert the signal to a different format which can be accepted by the nearby terminal.

Thus, according to this aspect of the invention, the network supports a number of different signal format conversions, and is able to choose between the different terminals and associated different format capacities in the neighborhood of a given mobile user.

It may at this point be mentioned that in so-called 'Computer-Telephony Integration' (CTI), it has been proposed to group a computer and a telephone on the same desktop together; to note when a particular user logs onto the computer, and to route all that user's telephone calls to the telephone with which the computer shares a desktop, thus effectively tying together a particular telephone and a particular computer in a pair.

This differs fundamentally from the present invention, however, in which the nature of each terminal in an area is stored and a given terminal is selected depending on the format of the input signal.

For this aspect of the invention to be useful, the signal must not be delivered to a terminal which is too distant to the user. Accordingly, the system must maintain accurate information of a large number of terminals, so as to establish a "communications neighbourhood" around any position at which a mobile user might be located. Thus, fairly frequent position update messages tracking the position of the user, and terminal update messages tracking changes to the capabilities of the terminals may take place.

In order to avoid the possibility of such messages swamping the signalling capacity of the network, in a preferred embodiment the present invention provides for a hierarchical arrangement of location data storage, with distributed local databases (e.g. one per LAN, or one per building, or one per cell, microcell or picocell) storing details of the terminals provided therein and the users located close by, and at least one higher layer of databases each covering an area corresponding to a plurality of the local databases and containing, for each user within the wider area, a pointer to the local database within which the user is located.

Thus, when a user changes position, the position change signal need be transmitted on as far as the local database within the area in which he moves or, if he changes from the area of one local database to another, to the new local database and to the next database up in the hierarchy containing both local databases. Likewise, changes in terminal equipment need only be signalled within the area of a local database or to the layer above.

Our earlier international application WO 94/28683 (agents reference A24601) includes an embodiment in which, within a single network, parts of the network set up a service by obtaining prices from other parts of the network. Thus, when a user desires to transmit through the network, he polls a first part of the network, and which polls further downstream parts of the network, and so on, each part of the network then transmitting back a price. Whilst this arrangement is suitable in many applications, as networks grow in size the amount of signalling generated within the network may be substantial.

Accordingly, in a preferred embodiment of the invention we provide a telecommunications system which routes messages therethrough, in which bidding takes place in two stages; a first stage in which an estimated bid is made prior to derivation of the route, and, if accepted, a second stage in which the route is set up by a further bidding process. This has the advantage of reducing the number of bidding (and therefore signalling) entities at any time whilst maintaining a reasonable response time in setting up the route.

Furthermore, in a preferred embodiment, multiple passes may be employed corresponding to successive layers of a hierarchical organisation of bidding entities, those entities in the middle layers acting as resource suppliers to entities in layers above them and as resource purchasers to entities in layers below them. This enables further increases in the size of the network without vastly increasing the volume of signalling traffic across the network, particularly if (as preferred) the entities in each layer are geographically distributed.

For example, the arrangement adopted may consist of an entity storing data relating to each customer and arranged to decide whether or not to accept a service on behalf of that customer; a number of service offering entities each of which is arranged to offer a service at a price in the first pass; and, for each service offering entity, a number of resource entities each corresponding to an available network resource (such as a signal format converter or a signal path).

Other aspects and embodiments are described below, with advantages which will be apparent hereafter.

BRIEF DESCRIPTION OF THE DRAWINGS

The invention will now be illustrated, by way of example only, with reference to the accompanying drawings in which.

DETAILED DESCRIPTION OF EXEMPLARY EMBODIMENTS

General overview of physical layer

Figure 1:
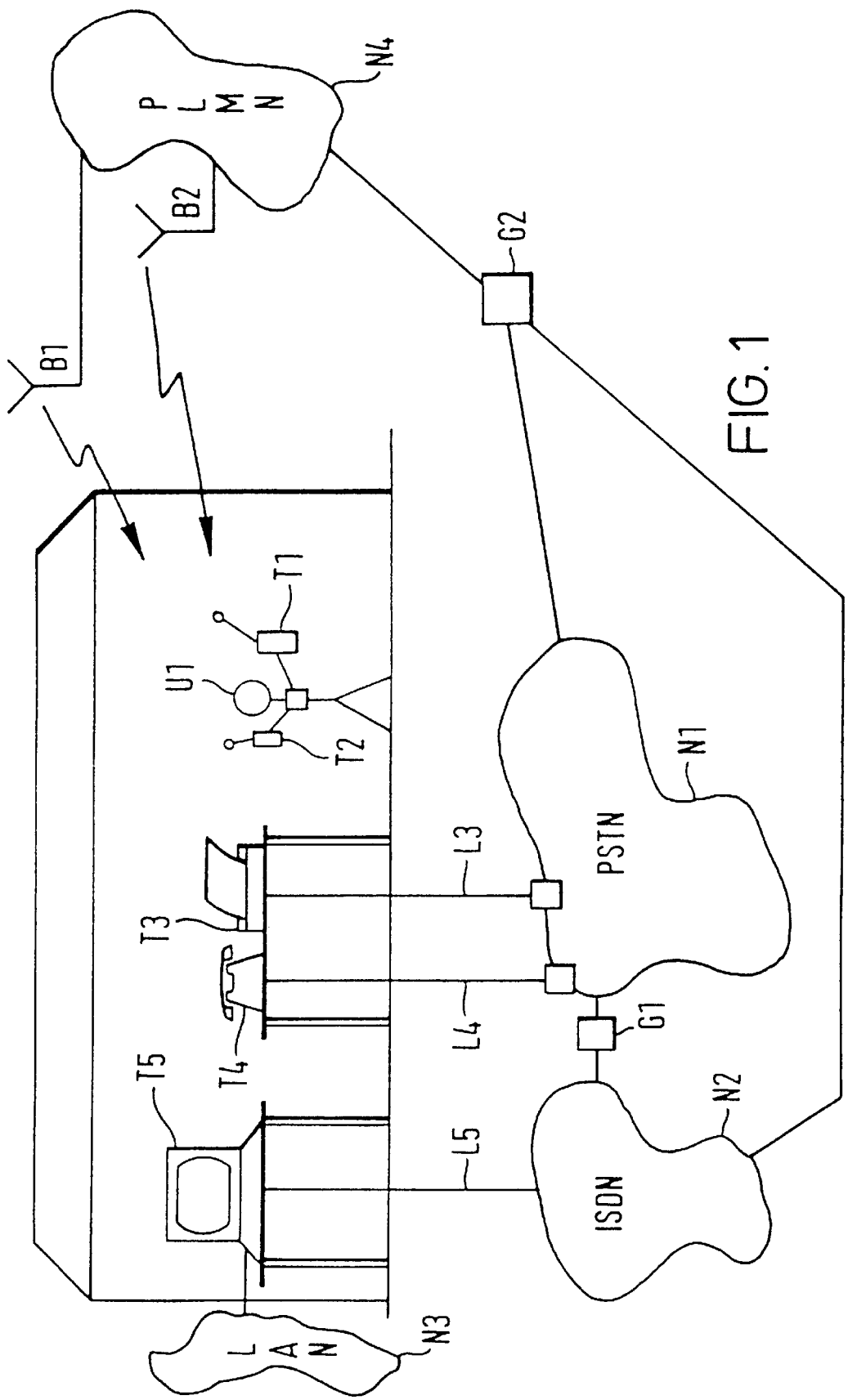
FIG. 1 is a schematic diagram illustrating the physical, or transport, layer of a telecommunications system according to the invention.

Referring to FIG. 1, at the physical or bearer level the telecommunications environment of a user U1 comprises a cellular telephone T1 and a personal digital assistant T2 carried by the user; a facsimile apparatus T3 and conventional telephone T4 at a desk a few feet from the user; and a computer workstation T5 including a modem at a desk top some meters away from the user, all within a single building.

The workstation T5 in this case comprises a local area network (LAN) server, connected to further terminals T6–T9 (not shown) at different distances from the user.

The various terminals T1–T9 are each capable of receiving different signal formats, as follows:

T1—voice or low bit rate data.
T2—low bit rate data (receive only).
T3—facsimile image signals.
T4—narrow bandwidth audio.
T5—high bit rate data in various formats.

In communication with the various terminals are a number of different communications channels forming parts of different notional networks (although some or all may be commonly owned).

A public switched telephone network (PSTN) N1 is connected via a local line L3 to terminal T3, and via local line L4 to terminal T4.

An integrated services digital network (ISDN) N2 is interconnected with the PSTN N1 via a gateway G1 (e.g. a local or international switching centre), and is connected via an ISDN line L5 to terminal T5, and hence to local area network N3.

A public land mobile network (PLMN) (e.g. a GSM—compatible digital cellular network) N4 is connected via a gateway G2 to the PSTN N1 and ISDN N2. A base station B1 of the PLMN provides a picocell in the environment of the building within which the user U1 is located, and a base station B2 provides a cell within the same general area.

Thus, the networks N1–N4 are capable of delivering data at different rates to the various terminal T1–T9; low speed data via the PLMN N4, higher speed data via the PSTN N1, and yet higher speed data via the ISDN N2 or LAN N3.

The user U1 carries a tracking device P1 via which his position within the telecommunications environment may be tracked. For example, in this embodiment the tracking device P1 comprises a chip carrying card of "smart card" carrying data identifying the user, and some or all of the terminals T1–T9 carrying a card reader arranged to read the card. Alternatively, it could comprise a 'smart badge' device, the location of which is tracked within the building.

Specifically, the workstations T5–T9 and the cellular telephone T1 carrying such smart card readers. Additional smart card readers are installed at access doors within the building and are connected to the LAN N3 to signal thereon.

Further, preferably, the cellphone T1 comprises, in addition to cellphone communicating components, a global positioning system (GPS) receiver and is arranged to derive and signal its position periodically as disclosed in EP 0467651 (Motorola).

Thus, the position of the user U1 is known by one or more of several means; firstly, it is known to which terminal he has logged in by the insertion of his smart card; secondly, the position of his mobile phone is known; and thirdly, his position within the building is known (from the access door system).

General Overview of Control Layer

Figure 2:
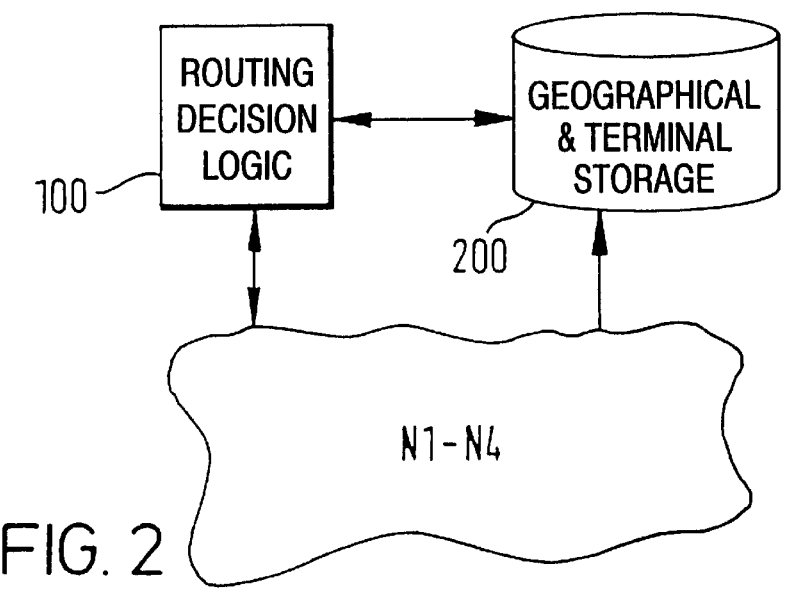
FIG. 2 is a schematic block diagram illustrating the components of the network control layer of the system of FIG. 1.

Referring to FIG. 2, the routing of calls to and from the user U1 via the networks is performed in accordance with routing decision logic 100 and geographical and terminal storage 200. The storage 200 (which, as described in greater detail below, takes the form of a distributed database) receives user position information and terminal information via signalling channels of the networks N1–N4, and supplies this information on request to the routing logic 100.

The routing logic 100 (comprising, as discussed in greater detail below, distributed control programs) sets up the switches through the networks to route the message as desired to or from the user U1.

Position and Terminal Databases 200

Figure 3:
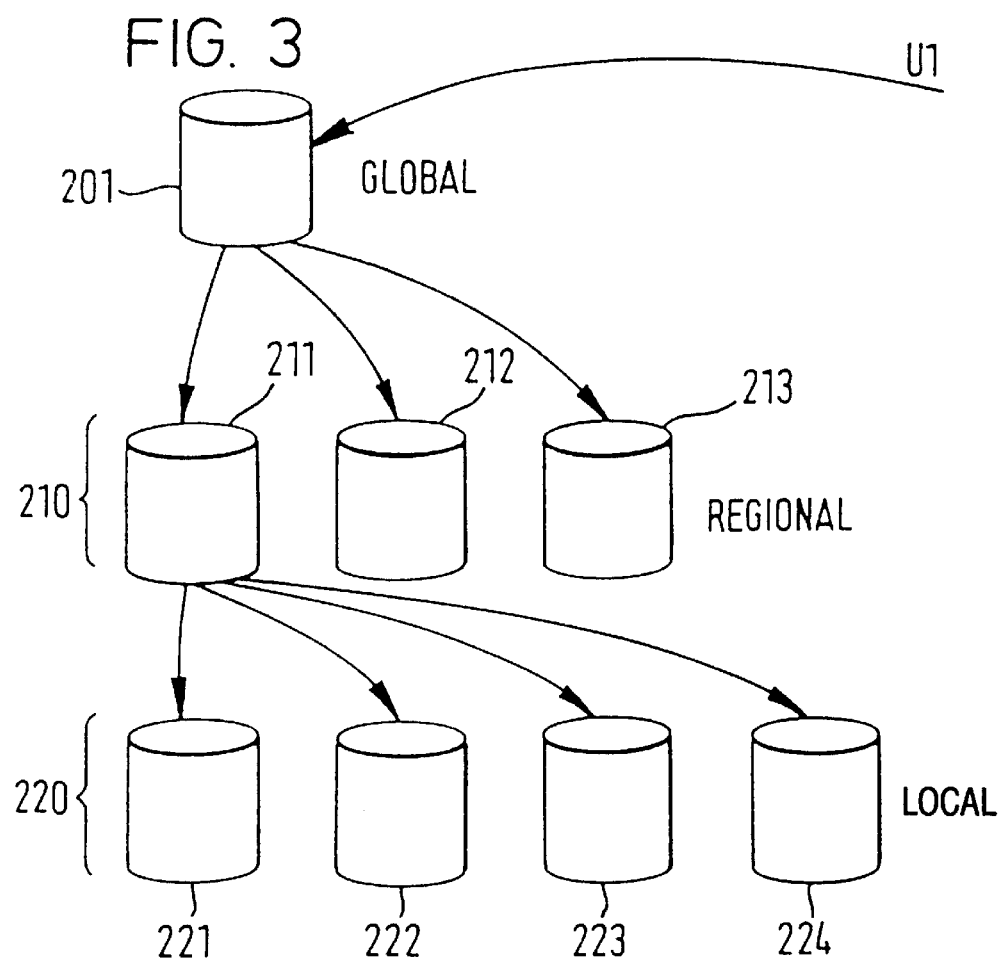
FIG. 3 is a schematic diagram illustrating the components of a position tracking system forming part of FIG. 2 and the logical relationships between them.

Referring to FIG. 3, the storage 200 comprises a distributed hierarchical database comprising a home layer 201 consisting of, for each user U1, a unique database station where details of that user are registered (similarly to the home location register (HLR) of GSM); a local layer 220 consisting of a plurality of located databases 221–224, each storing details of users and terminals within its local area, and (in this embodiment) one or more intermediate layers 210 comprising a plurality of regional databases 211–213 storing records of users in a wider geographical area covering that of several local databases 221–224.

For example, the regional databases 211–213 might each be associated with a coverage area approximately equal to the coverage area of a mobile switching centre (MSC) or local exchange, whereas the local databases 221–224 each relate to a small area (e.g. a floor of a building, a single local area network, or a picocell).

Figure 4:
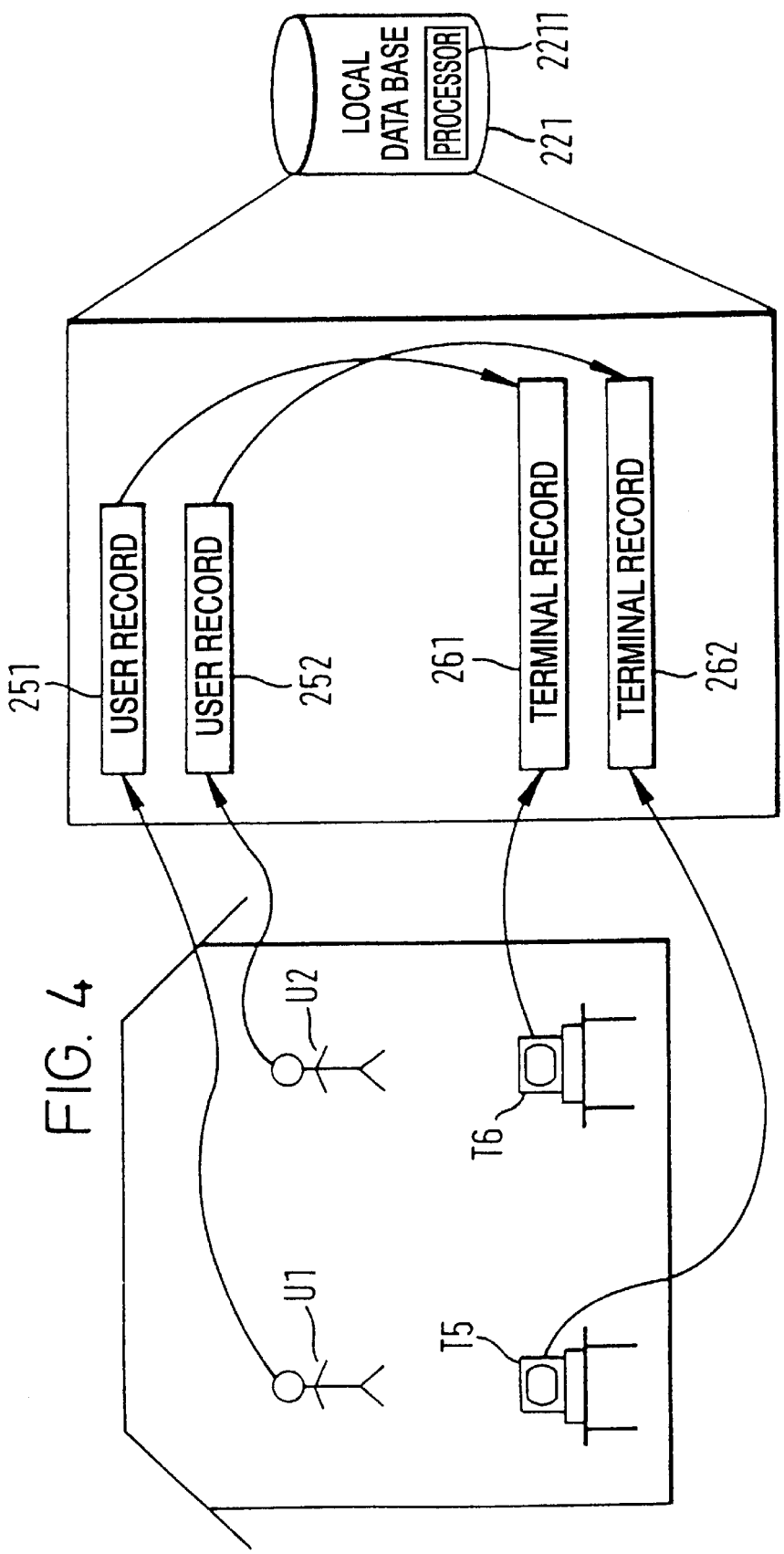
FIG. 4 is a schematic diagram showing the elements stored within a local database forming part of FIG. 3 and the logical relationships between them.

Referring to FIG. 4, each local database (which is conveniently provided by a large volume random access memory, or high speed off-line storage device such as a RAID disk array) comprises a first set of user records 251, 252 . . . each relating to a single user in the locality, and a plurality of terminal records 261, 262 . . . each relating to an item of terminal equipment in the locality (e.g., in this case building).

Each user record 251, 252 . . . contains data recording the position of the user. Each terminal record 261, 262 contains data identifying the technical characteristics of the respective terminal to which it corresponds.

Where a user is logged on to a terminal (e.g. U1 with T5 or U2 with T6) the corresponding user record includes a pointer to the relevant terminal record (e.g. 251 to 261 and 252 to 262).

Figure 5A:
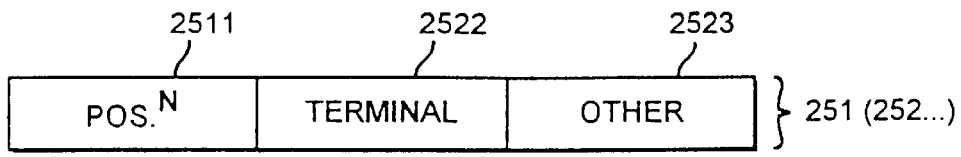
FIG. 5a to 5c show schematically the content of records held within the database of FIG. 3.

Referring to FIG. 5a, in greater detail, a user record 251, 252 . . . comprises a field 2521 for storing the users position (e.g. this three dimensional position in space, defined in altitude, latitude and longitude); a field 2522 specifying the terminal (if any) to which he is currently logged on (and containing a pointer to that terminal); and, optionally, other user information (2523) such as the access rights of the user (i.e. whether he can use all terminals or only one).

Figure 5B:
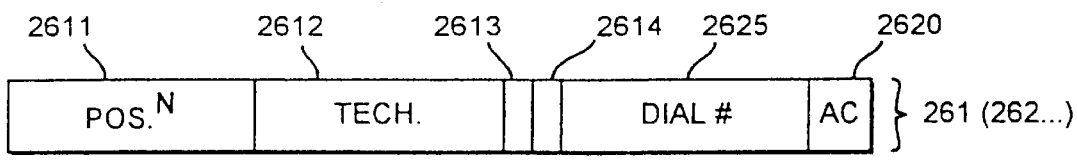

Referring to FIG. 5b, each terminal record (261, 262 . . . ) comprises a field 2611 identifying the geographical position of the terminal (e.g. in latitude, longitude and altitude); and a field 2612 indicating the technical characteristics of the terminal.

This latter field may consist of a list of format type records 2613, 2614 . . . each itemising a signal format which the terminal can receive.

Alternatively, the field 2612 could comprise a pointer to a separate record of the technical specification of the terminal, or a generic record specifying the capabilities of all terminals of that type.

A field 2620 specifies the access rights (i.e. any limitations on users who can access the terminal, or classes of user who are permitted to do so).

Finally, a field 2625 specifies the dial number, network user address or other routing data which will enable a call to be routed through to the terminal, and consequently specifying the part of the network to which it is attached.

Figure 5C:
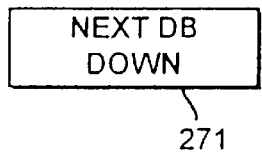

Referring to FIGS. 3 and 5c, a given regional database 210 will contain a user position field (271, 272, 273 . . . ) for each of the users within its region, comprising the union of all the users in all the localities making up the region. Each user field 271 (272, 273 . . . ) simply comprises a pointer to the local database 221, 222, 223, 224 . . . in which the position record for that user is stored (and within the locality of which that user is last detected).

Likewise, in the home database station 201 for the user concerned, a further user field 271 is present for that user, containing a pointer to the identity of the regional database 211, 212, 213 . . . within which a field for that user is stored.

Thus, each user record is duplicated n times, where there are n layers present in the position tracking distributed database (in this case, 3).

Locating a user

Figure 6:
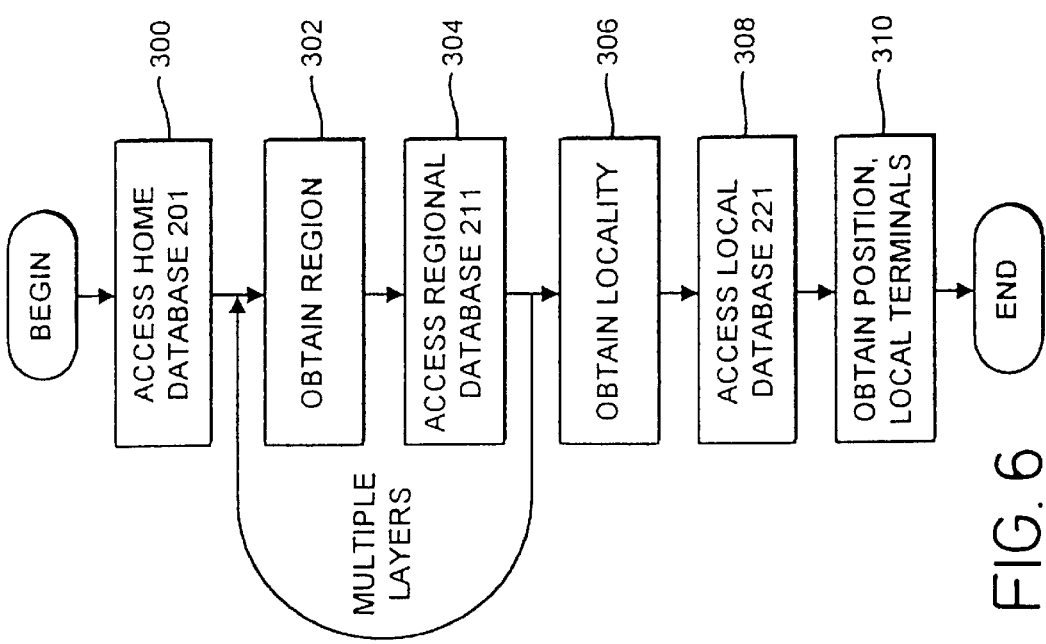
FIG. 6 shows schematically the process of obtaining information from the storage system of FIG. 3.

Referring to FIG. 6, when it is desired to determine a user's location, his home database 201 is accessed (based on his dial number, his international mobile subscriber identity, network user identity or some other identifier associated with the user) in a step 300. In a step 302, the region database (211–213) is determined from the user field within the home database 201, and in a step 304 this regional database is accessed. If there are further intermediate layers in the hierarchical database, steps 302 and 304 are repeated as necessary to move down through the layers of the hierarchy.

Ultimately, in a step 306, in a regional database the identity of the local database associated with the locality in which the user is presently to be found is read, and in a step 308 the local database (221–224) is interrogated via an interrogation signal, and replies in step 310 with a message including the current user position, and the terminal records of all nearby terminals, including the positions and technical characteristics thereof.

Each local database station 221–224 may comprise a processor 2211 arranged to calculate the range from the user to each terminals and to exclude those terminal which are beyond a certain distance from user; it may also be arranged to compare authorisation data for each terminal with authorisation data stored for the user and to transmit details of only those terminals for which the user is not denied access.

The distributed databases are interconnected via signalling channels forming part of the signalling layer carried over the physical layer of FIG. 1, to permit the databases to be interrogated, read and written to.

Routing an Incoming Call

Figure 7:
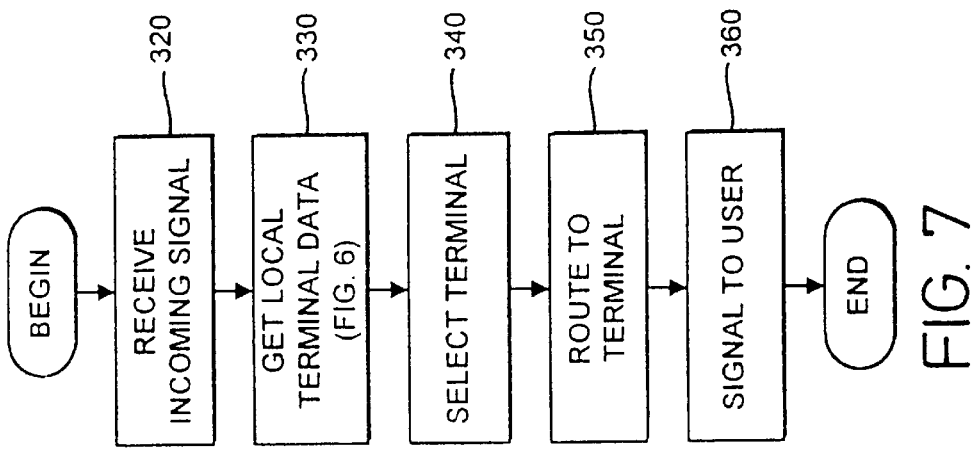
FIG. 7 shows schematically a first process of routing information through the network of FIG. 1 according to an embodiment of the invention.

Referring to FIG. 7, the process performed by the routing logic 100 in routing an incoming call to a user will now be described. In a step 320, an incoming signal in a particular format for the user is received in some portion of the physical layer of FIG. 1 and the identity of the user is determined and relayed to the routing logic 100.

In a step 330, the routing logic 100 interrogates the position tracking system 200 by performing the process of FIG. 6, to obtain thereby the position of the user and the list of nearby terminals and their corresponding technical capabilities.

In a step 340, the routing logic 100 selects one the nearby terminals, on the basis of its technical characteristics. For example, if the incoming signal is a facsimile signal, but the nearest terminal to the user U1 is his mobile phone T1 or pager T2, neither of which can receive an incoming facsimile signal, then the nearby facsimile terminal T3 may be selected and the signal routed thereto in a step 350.

Having selected the terminal to which a signal should be routed, in a step 360 an alerting signal is generated and transmitted to the user; for example, the alerting signal could be an alphanumeric message to his PDA terminal T2 stating "FAX ROUTED TO TERMINAL T3 AT POSITION . . . ", and accompanied by an alerting signal.

Equally, the message could comprise a recorded call announcement delivered as a call to his cellular telephone T1.

Thus, to sum up, according to the process of FIG. 7, the format of the call is inspected and it is delivered to a terminal nearby in which it is suitable to receive that format, and the terminal nearest the user (preferably his pager or cellphone) is alerted to the destination terminal of the signal.

Position updating

Figure 8A:
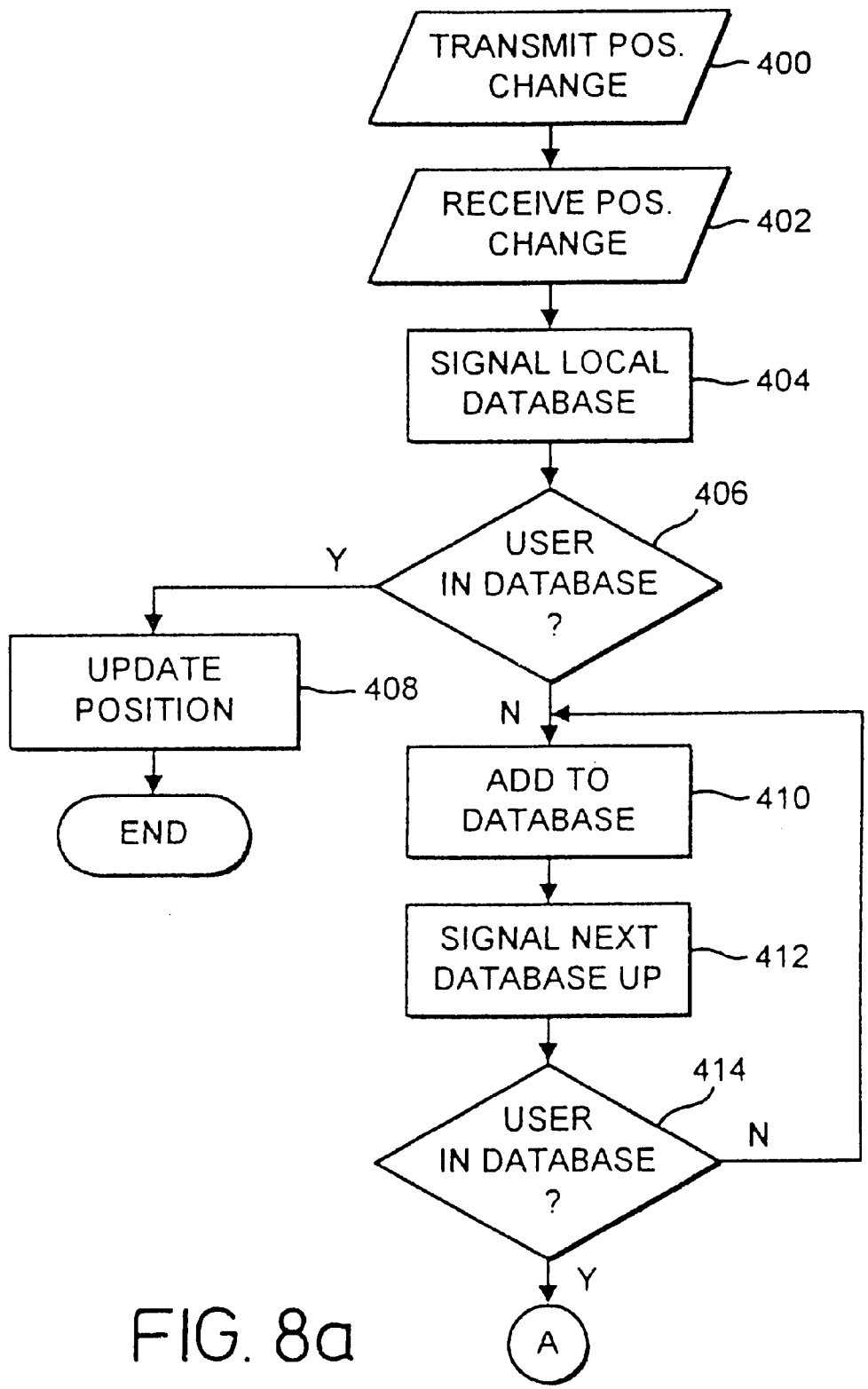
FIG. 8 (comprising FIGS. 8a and 8b) is a flow diagram showing schematically the process of updating information held within the databases of FIG. 3.
Figure 8B:
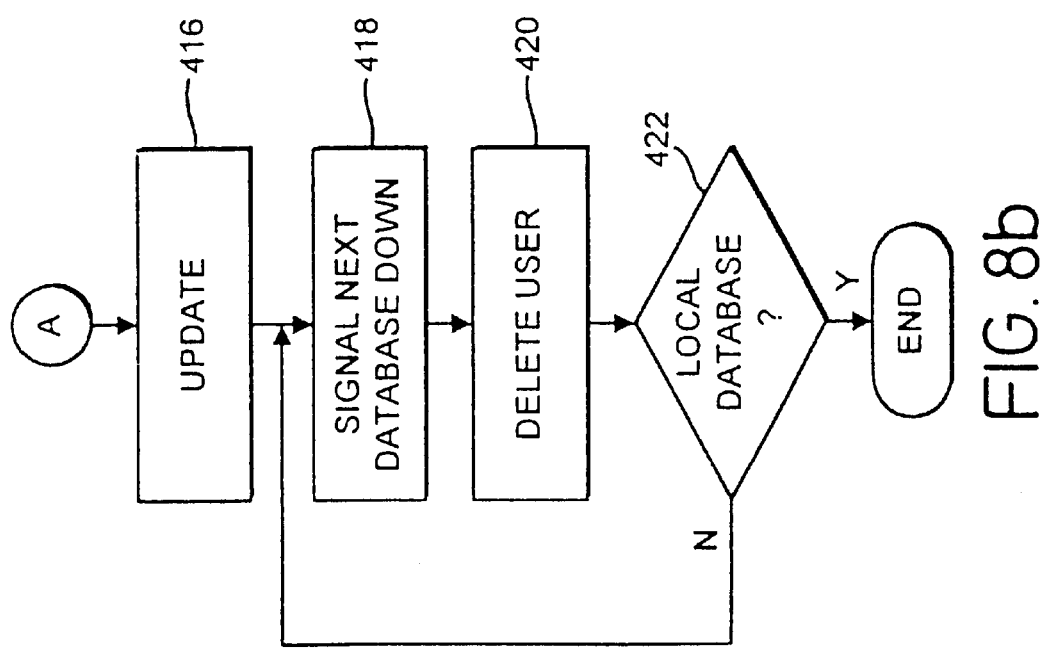

The updating of a user position will now be described with reference to FIG. 8 (comprising FIGS. 8a and 8b).

In a step 400, a user position update signal is transmitted; either from one of the terminals T1–T9 on registration of the user therewith, or from a position sensing element in the building (for example a door containing a card reader), or from the mobile telephone terminal T1 (where this is equipped with some position determination means), or from the PLMN N4 (where this determines the relative position for the user by ranging measurements from several base stations B1, B2 . . . ).

A position change signal (containing the identity of the user and either a new latitude, longitude position or the identity of a new terminal with which he is registered), is transmitted in step 400, from whichever of these sources originated the message, to the local database for the locality.

For example, in the case shown in FIG. 1, the terminals and door card readers transmit the position update signal via the LAN N3 to the LAN server T5, at which the local database station is located.

On receiving the position update signal (step 402) the LAN server T5 or other element of the physical layer signals to the local database (step 404).

The local database determines whether the user is one for which a record is already stored (step 406). If so, the stored record for the user is updated (step 408) to reflect the users new position; if a new position is received, the position is written to the record, whereas if the signal indicates that the user has registered at a door or on a terminal, the position data of the door or terminal is written to the user record.

If the user is not already present in the local database, a record is created (step 410) and his position is added. Then (step 412) a signal is transmitted up to the regional database within the region of which the local database falls.

The regional database examines whether a record is already stored for the user (step 414). If not, the regional database now executes steps 410–414, to create a record for the user including a pointer to the local database the user is now in, and to signal up to the database in the next layer above (i.e. the database responsible for a wider area within which the region falls).

If multiple such intermediate layers exist, this process is repeated until, at some database, a record is found for the user in step 414, in which case that database updates (step 416) the record to point to the new database in the layer below within which the user lies.

It now remains to remove the previous, erroneous, records of the user from areas where he has previously been located; accordingly, the database which has updated its record signals down to the database in the layer below to which the record previously pointed (the pointer now being inaccurate) in step 418.

This database in the layer below then deletes the user from its record in step 420. If (step 422) it is not a local database (i.e. if its user record points to another database in a layer below it, rather than defining the position of the user), then the database repeats steps 418 and 420, and so on until the original local database within which the user was previously recorded is reached.

Thus, it will be seen that, by the updating process of FIG. 8, location information is updated within a localised area, due to the hierarchical organisation of the databases. That is, if a user moves within a single database then mobility management signals travel no further than that local database (which in practice is confined to a small area).

If a user moves from one locality to another nearby but within the same region (i.e. so that his record remains within the same regional database) then signalling is confined within that region, and so on.

Thus, increasing the size of the network does not lead to exponential increases in the volume of mobility signalling traffic, since such traffic remains localised.

On each occasion when a new terminal is added, or the position or the technical characteristics of a terminal change, this is reported to the local database.

Format conversion

Figure 9:
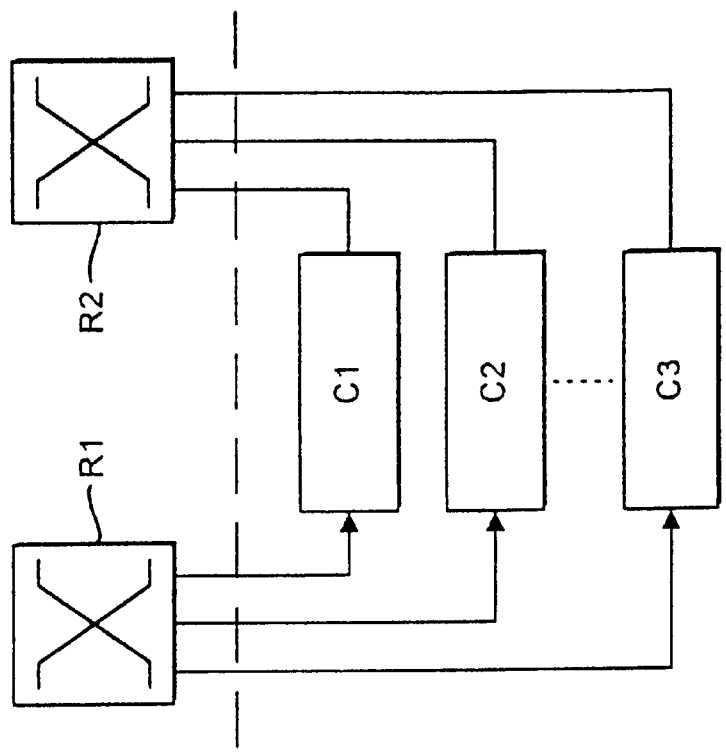
FIG. 9 is a block diagram illustrating the structure of signal format converters comprised within the network of FIG. 1.

Referring to FIG. 9, in this embodiment there are preferably provided a plurality of format converters C1, C2 ... C3 within the network. The physical location of the format converters is unimportant, but some means for routing signals to and from the format converters (shown here as a pair of routing switches R1, R2) is provided, under control of the routing circuit 100, which can therefore route an incoming signal via one, or a succession, of the converters C1–C3 on route to the user.

Format Conversion types

The converters may perform one of the following format conversions (but the following is not intended to be a limiting list):

3D graphics to 2D graphics and vice versa;
Image graphics to facsimile and vice versa;
Facsimile to text (e.g. optical character recognition) and vice versa;
First application output (e.g. spreadsheet) to second application output (e.g. wordprocessor);
Wordprocessor output to text and vice versa;
Text to speech and vice versa (speech recognition);
First video format to second video format (e.g. full rate video to MPEG compressed video);
Text to summary (i.e. automatic document abstracting);
Picture to text (i.e. image recognition);
First human language to second human language (i.e. machine translation);
First speech coder format to second speech coder format (e.g. ADPCM to GSM and vice versa);
First database search query language to second database search query language.

From the foregoing, it will be apparent that the format conversions may be grouped into one or more of the following subgroups:

1. Lossless format translation;
2. Lossy compression;
3. Translation from one medium to another (e.g. from a format recognisable by a first human sense to a format recognisable by a second human sense).

In this embodiment (and as will be described in greater detail), the routing logic 100 is arranged to determine whether the received signal may be delivered to a terminal near the user.

If no nearby terminal can support the incoming signal format, the routing logic 100 is operative to determine whether, after conversion by one or more of the converters C1–C3, the message could be delivered in a format receivable by one or more of the terminals near to the user and, if so, routes the signal via that converter or those converters to such a terminal.

Routing Logic 100

It will be apparent that many ways of implementing the control logic 100 to achieve the above functionality are possible. However, for the reasons described in the above referenced prior art, it is advantageous to employ a so called "agent based" control mechanism. The term "agent" is used with a number of different senses in the literature; here, except where the context makes it clear that this is unnecessarily limiting, it will be understood to mean an independently executing control program under control of which a computer or computer controlled switching centre performs the functions attributed to the "agent". The term is not necessarily limited to control programs which monitor their environment and adapt their behaviors and response thereto, but encompasses such programs.

Each agent makes use of data, and it is convenient that the agents should therefore operate in "object-oriented" fashion; that is to say, that the data should be "encapsulated" so as to be accessible alterable only by associated control programs, acting is response to "messages" (which need not, however, be physically transmitted but could simply be data passed via the stack of a single computer). It will, however, be understood that the object oriented format is in essential to the invention.

Figure 10:
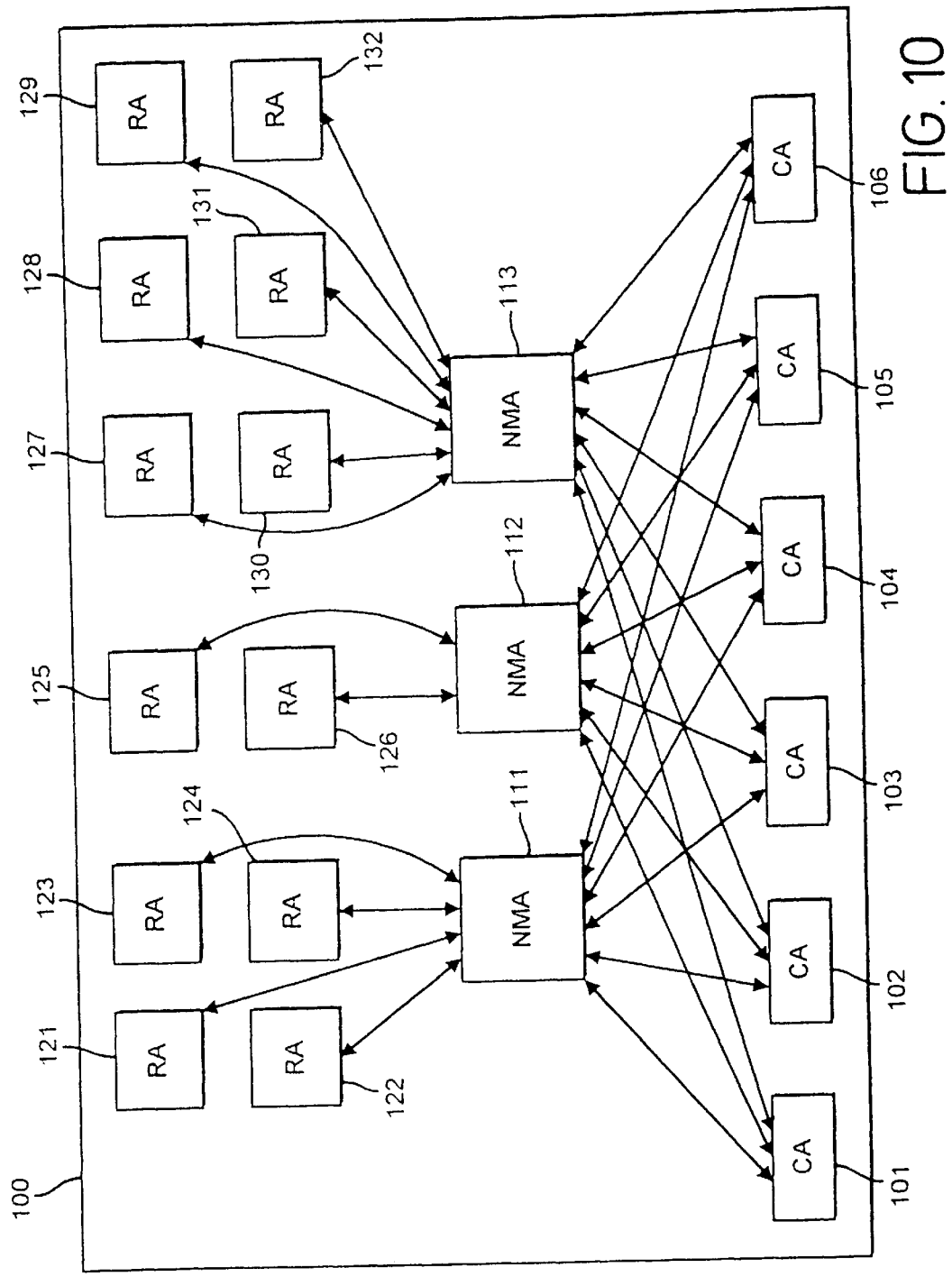
FIG. 10 is a schematic diagram showing the software components making up the routing logic of the control layer of FIG. 2.

Referring to FIG. 10, the routing logic comprises at least one computer 100 connected via a signalling link to the physical layer of the network, and including storage areas storing data and control programs defining a plurality of customer agents 101–106 . . . ; a plurality of network manager agents 111–113; and a plurality of network resource agents 121–132.

Conceptually, and as will be described in greater detail below, each customer agent 101–106 represents an actual customer, and comprises stored data relating to the customer to enable the network to carry out activities in relation to the customer even when the customer is not connected to the network. The number of customer agents is therefore very large.

Each comprises a section of random access memory storing fields containing the following data:

User name;
Identity of home database 201;
Billing point;
Customer format preferences;
Customer billing preferences;
Selection algorithm.

The customer agent further contains stored programs for executing the following processes:

1. Request outgoing service;
2. Select outgoing service;
3. Select incoming service format;
4. Update customer data.
5. Update selection algorithm.

The network management agents 111–113 comprise random access memory storing:

Data specifying the input and output formats between which the converters present in the network can convert;

Anticipated price data for each such type of conversion, and for standard types of service;

Data on current high-level network conditions (for example, time of day, and general level of traffic). A pricing algorithm.

Each network managing agent is also associated with program code to perform the following functions.

1. Receive service request;
2. Price service request;
3. Set up service through network;
4. Update data;
5. Update pricing algorithm.

Each network managing agent is associated with a particular area of the physical layer; for example, in FIG. 1, separate network managing agents may be provided for the PSTN N1, ISDN N2 and PLMN N4; and more specifically, within each of these networks a separate managing agent may be provided for each major region (for example one network managing agent may be associated with each mobile switching centre of the PLMN N4 and major exchanges of the PSTN N1).

Resource agent

Each resource agent 121–132 relates to a specific hardware structure within the physical layer of the network, such as a converter (C1–C3); a routing switch (R1, R2), e.g. an exchange or mobile switching centre; a transport component such as a cable, base station or satellite channel; or the like. Each resource agent therefore stores data representing the following:

Physical characteristics of the resource (input and output formats);

Current state of loading of the device; Time of day.

The resource agents also comprise random access memory storing code performing the following functions;

1. Receive service request;
2. Price service request;
3. Set up service through resource;
4. Update data;
5. Update pricing algorithm Hierarchical arrangement Although only a single layer of network managing agents 111–113 is shown here, it is envisaged that in larger systems, each network managing agent may act as a network resource agent to a higher level of managing agents, so as to produce a hierarchical structure. For simplicity, however, only a single layer of network managing agents will be described hereafter.

Geographical arrangement

The routing logic 100 may be provided by a single large computer including processor and storage capacity for all the above described data and processes.

However, in order to avoid bottlenecks of signalling traffic, it is more convenient in this embodiment to distribute the various agent functions.

Conveniently, the resource agents 121–132 are located at or close to the resources to which they relate (e.g. are provided as software running on local or regional exchange control computers), whereas the network management agents are located centrally within the segment of the network which they control (for example at a network control station or major switch, as software running on the control computer thereof).

Customer agents 101–105 may conveniently be co-located with network managing agents 111–113, or with the home database 201 for the customer concerned.

Overview of outgoing call process

The process of setting up a communication initiated by a first mobile party will now be described. Broadly, the first party gives an indication of the format in which it will transmit (and, if necessary, receive) and the party for whom the transmission is intended.

Each network managing agent then assesses whether it can deliver a broadly corresponding service to the vicinity of the remote party and the initiating party by assessing the position database, and replies accordingly with a proposed service and a corresponding price.

The initiating party customer agent selects one of the proposals and the call is set up in accordance with the proposal. To set up the call, the network managing agent which has made the successful proposal negotiates with the resource agents within its region to provide the service at a price within the specified constraints. Each resource agent assesses whether it can offer a service in setting up the required service and, if so, submits a price.

The network managing agent then selects the combination of resource agent which gives the best price whilst meeting the necessary format and other constraints and sets up the call accordingly.

In the process, a description of the service to be offered is built up during the negotiation between the customer agent, the network managing agent and each resource agent. The customer agent initially provides a partial service description specifying its requirements, and the remaining details and price are supplied by the network managing agent and resource agents.

Figure 11:
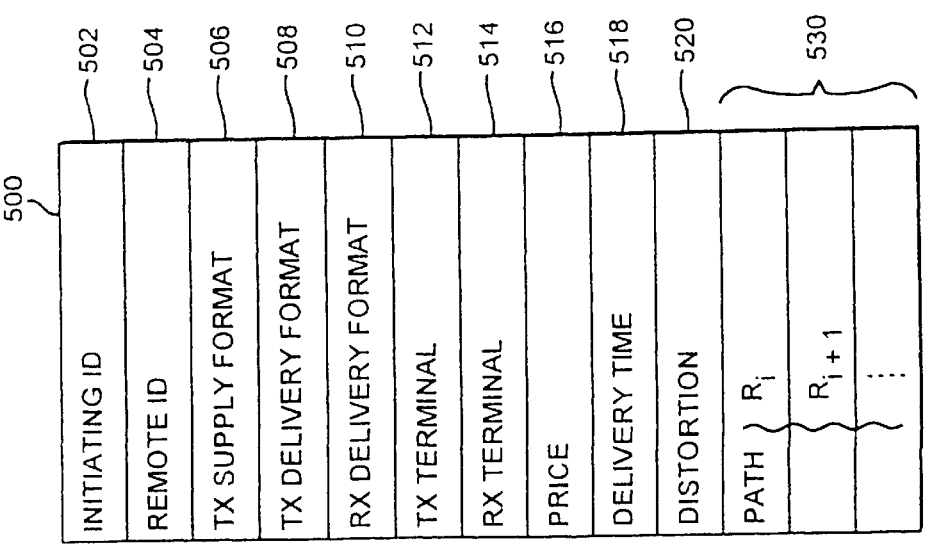
FIG. 11 shows the structure of a service request record message utilised in setting up a service in this embodiment.

Referring to FIG. 11, the service description is provided as a data record which can be amended by the customer agents, network managing agents and resource agents. The record comprises the following fields.

Initiating ID (502)—this field specifies the user who is initiating the service request.

Remote ID (504)—this field specifies the user to whom the service is to be connected.

Transmit supply format (506)—this field specifies the signal format which the initiating user will actually be supplying (e.g. speech, text or image).

Transmit delivery format (508)—this field specifies the format in which the signal will actually reach the remote party, after conversion (if necessary). Whereas all the preceding fields are filled in initially by the initiating party customer agent, this field may be left blank, or may contain a number of different possible supply formats.

Receive delivery format (510)—if the service is bi-directional (for example a telephone conversation, or text, video or audio conference) then this field contains one or more formats specified by the initiating party in which it would prefer to receive data from the remote party.

TX terminal (512)—this field is initially blank.

RX terminal (514)—this field is initially blank.

Price (516)—this field is initially blank.

Delivery time (518)—this field may be completed by the originating customer agent to specify a maximum delay in communication. For example, for voice communications, a maximum delay of ½ second might be set; for fax or data delivery, a maximum delivery time of 1, 10 or 20 hours might be set.

Distortion (520)—this field may be set by the customer agent to specify some maximum acceptable level of distortion of the signal; for example, for an image signal, conversion between different image formats may be distortion free but image compression will involve some loss of detail, corresponding to some notional distortion level of 10% or 20%.

Routing fields (530)—these fields are initially left blank.

Figure 12:
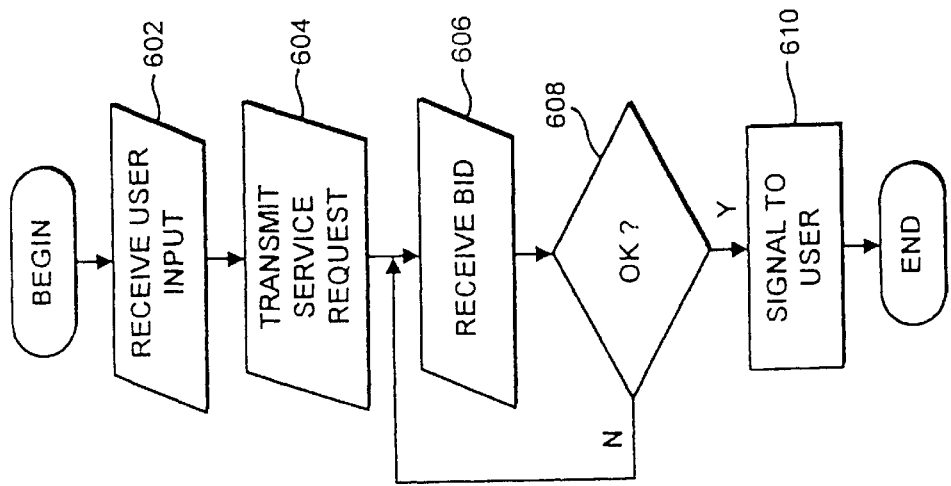
FIG. 12 is a flow diagram showing schematically the process of operation of a customer agent comprised within the embodiment of FIG. 10.
Figure 13A:
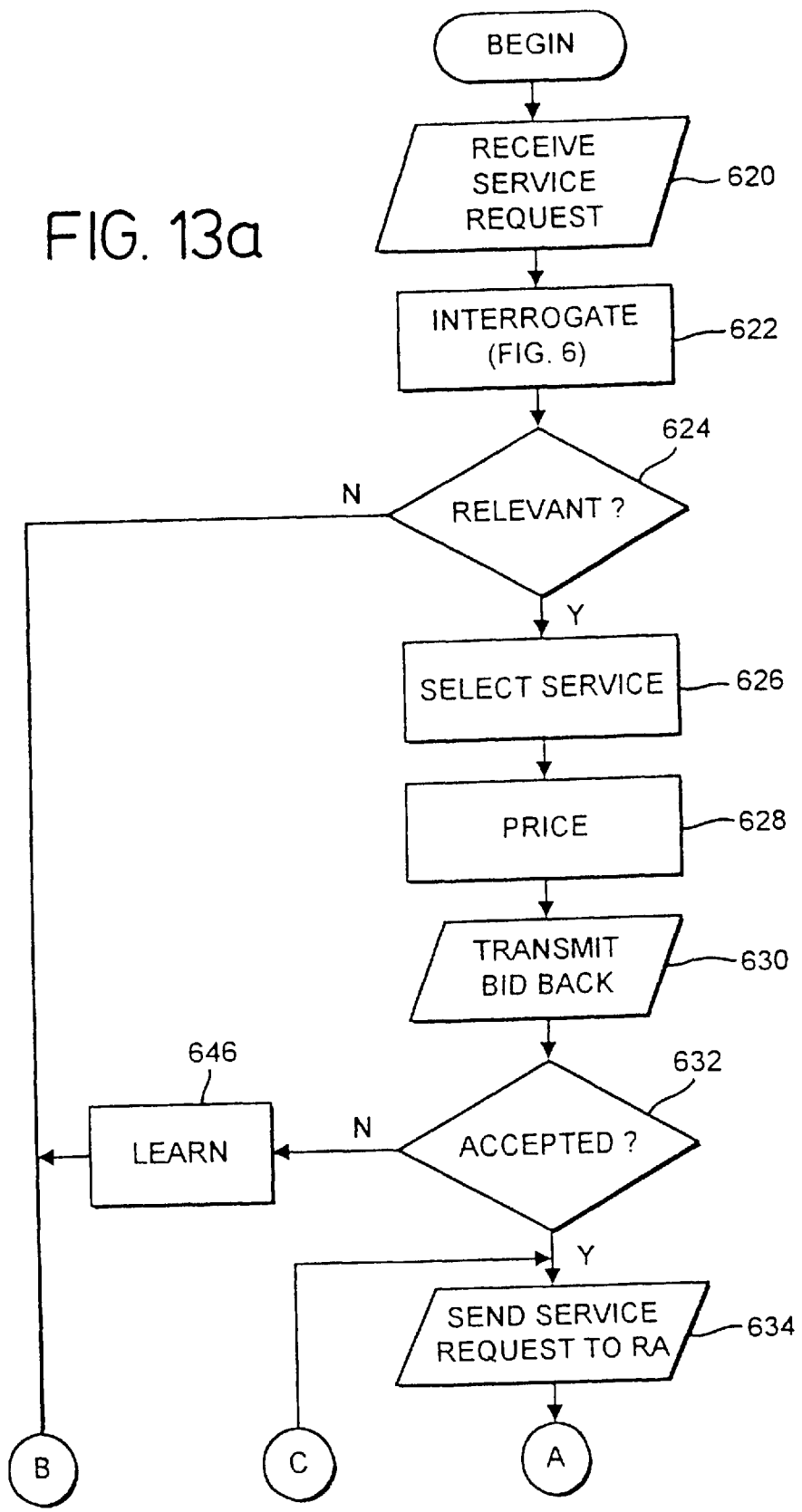
FIG. 13 (comprising FIGS. 13a and 13b) is a flow diagram showing schematically the process performed by a network managing agent forming part of the embodiment of FIG. 10.
Figure 13B:
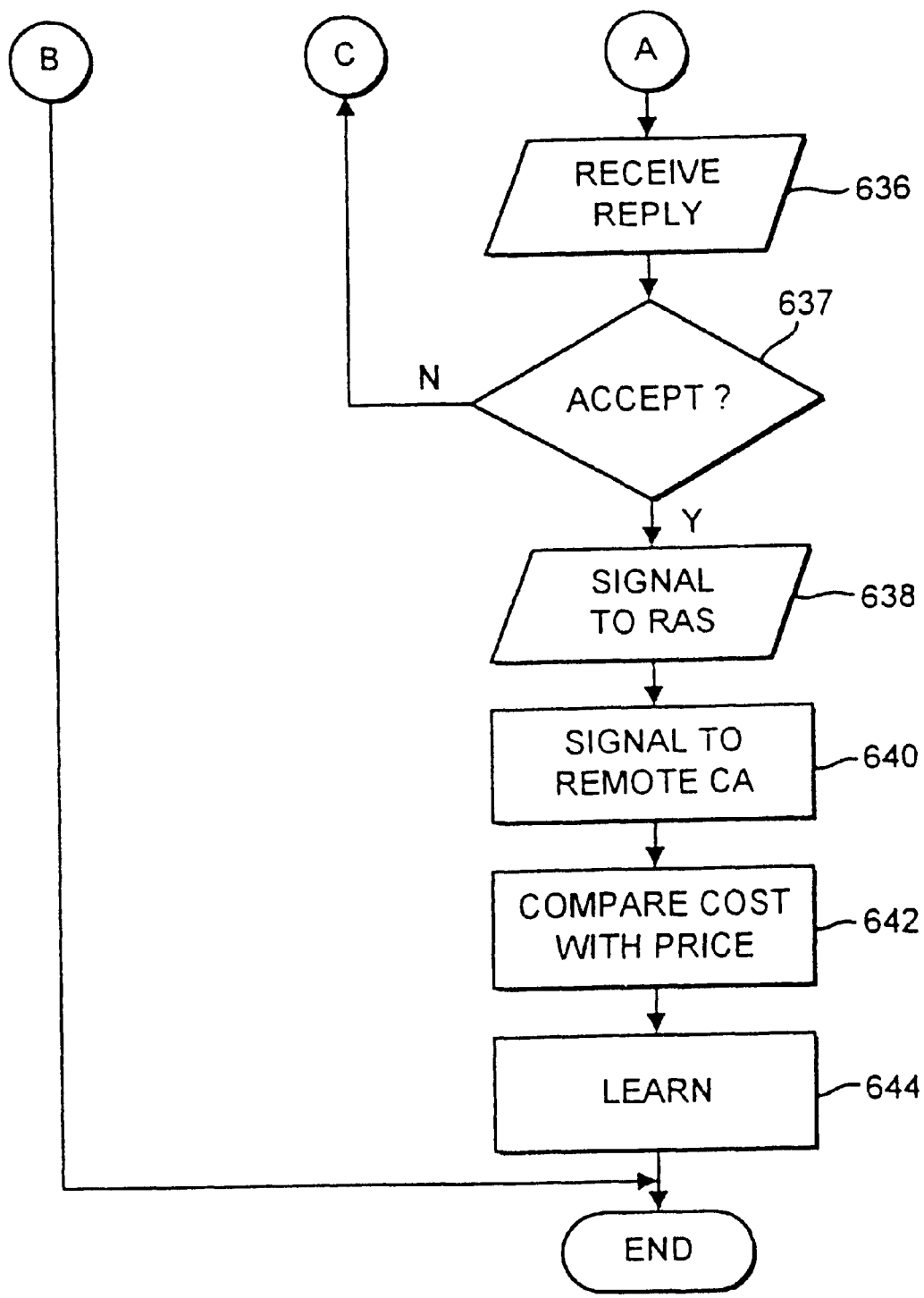
Figure 14:
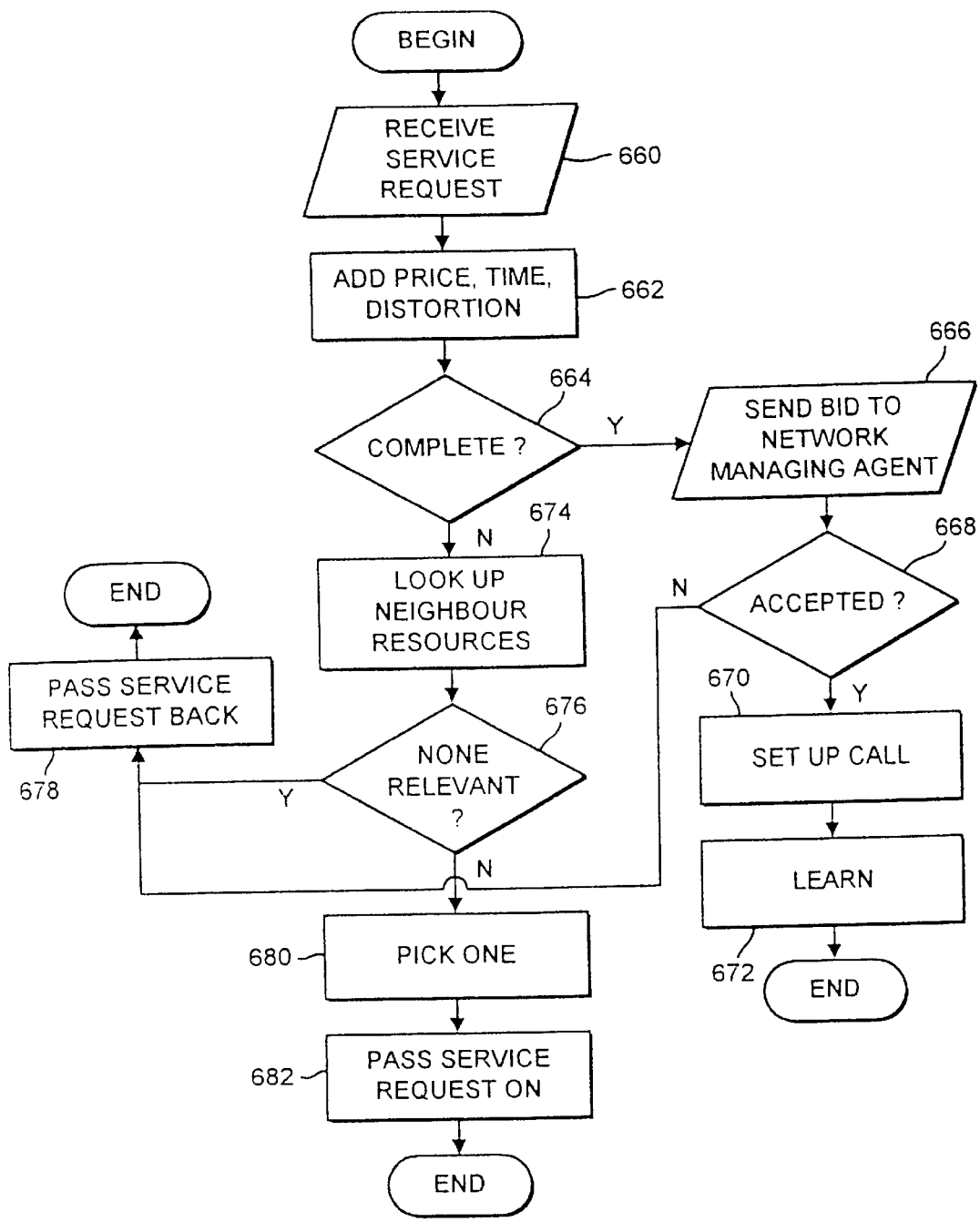
FIG. 14 is a flow diagram showing schematically the process performed by a resource agent forming part of the embodiment of FIG. 10.

Referring to FIGS. 12 to 14, (relating to the processes performed by the customer agent, network agents and resource agent respectively), this process will be described in greater detail.

The service initiating user indicates the service he wishes to receive, by taking a phone (T1) off hook, or entering data into a terminal (T3). The network (N1–N4) to which he is connected forwards this event to the customer agent (e.g.) which receives it (in FIG. 12 step 602). In step 604, the customer agent broadcasts a partially complete service request record 500 (as described above) to each network managing agent in the network.

In FIG. 13 step 620, each network agent receives the service request and (step 622) interrogates the home database for the originating and designation users, and receives back (as in FIG. 6) a list of nearby terminals (together with their available signal formats) for the originating and designation users, which are filled into the terminal fields 512, 514.

In step 624, each network managing agent determines whether there is any path via its available converters (C1–C3) which would convert a signal in the transmit source format to one receivable at one of the designation terminals (and vice versa if the service is bi-directional). If so, it selects the path which gives the shortest transmission time, and/or least distortion in reproduction (step 626), together with the terminals to be used by the initiating and designation users.

It when calculates a price for this service (step 628) based on its stored pricing algorithm, and transmits back the completed service request record 500 to the originating customer agent, including data in the field for the proposed terminals, formats, price, delivery time and distortion.

Referring back to FIG. 13, in step 606, the customer agent receives the first bid (i.e. completed service request) and determines (step 608) whether the bid is acceptable in price, quality, time and terminal proximity. The determination could simply involve relaying all details to the user for a decision, but preferably the customer agent, in this embodiment, calculates a weighted sum $$a_1(p)+a_2(t)+a_3(q);$$

where $a_1$–$a_3$ are constants or functions and p, t and q are price, time and distortion respectively if the sum exceeds a threshold, the bid is rejected and the customer agent awaits the next bid (step 606) from another network managing agent. (If all bids are rejected, the customer agent may issue anew service request).

When a bid is accepted, the customer agent signals back acceptance (step 609) and signals the accepted service to the user (step 610) in a message (as discussed above) advising him which terminal to use.

On acceptance (step 632), the accepted network managing agent then issues a service request record to resource agents (step 634) within the network with which it is associated.

Figure 15:
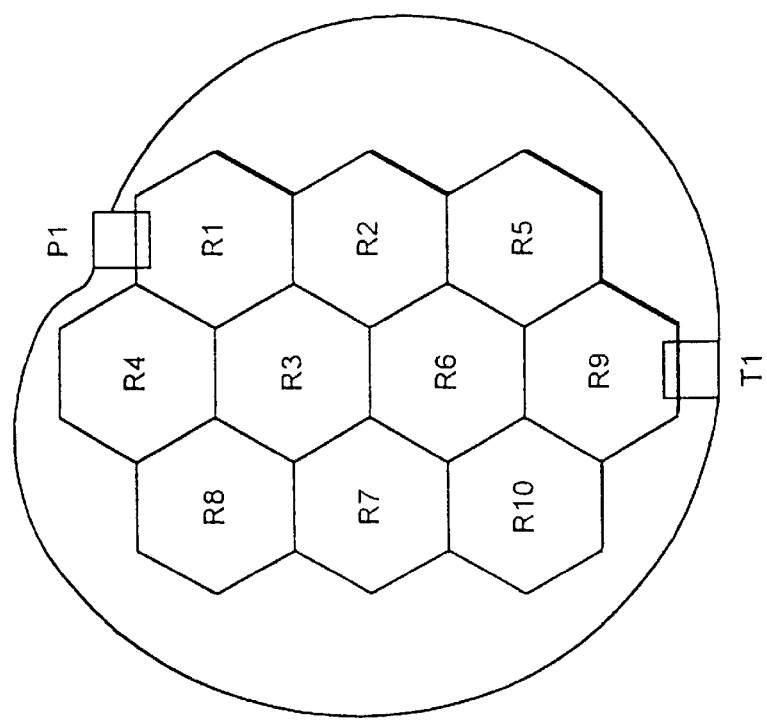
FIG. 15 is an explanatory diagram showing the distribution of a number of components through which a signal is routed according to the process of FIGS. 12 to 14.

Referring to FIG. 15, the resources within this network will be distributed throughout the area of the network; in FIG. 15 a set of resources R1–R10 are illustrated.

A signal to be delivered arrives at a port P1 of the network in the source format determined by the network managing agent, and is delivered at the destination terminal T1 in the delivery form at determined by the network managing agent (and agreed by the customer agent).

To cross the network, the signal must traverse at least one resource (which may simply be a land line or other single channel) and may require conversion (e.g. from a wordprocessing document source format to a speech delivery format).

Comprised within the resources R1–R10 are a wordprocessor (document)-to-ASCII text converter resource R3, and a text-to-speech converter R10. The other resources in this case may either be transparent transport devices or other converters.

Thus, the path taken by the signal should include, in order, the converters R3 and R10, linked by suitable transport resources.

From inspection of FIG. 15 is will be clear that the shortest routes are R1–R3–R6–R10–R9 or R1–R3–R7–R10–R9. Longer routes are equally possible, however.

Referring to FIG. 14, in a step 660, the service request is received from the network managing agent by the resource to which the input port at which the source signal is received in connected. In this case, this resource may for example be a switch connected to one of several further resources R2, R3 or R4.

The first resource R1 inserts into one of the routing fields 530 its identity and price in step 662.

In step 664, it determines whether it is connected t the destination terminal specified in field 514 and whether the signal output format it generates (which in which case is the same as the input format) is that required by the delivery format field 510. In this case, neither test is satisfied in step 664, and accordingly the resource agent proceeds to step 674.

At step 674, the resource agent reviews the list of resources to which it is connected (in this case, R2, R3, R4). If (step 676) none of these connected resources is relevant (because, for example, all are connected to gateway points out of the network) the possible route has reached a dead end, and the service request is passed back; in general, the service request is passed back to the preceding resource but where, as here, the resource is the first encountered in the network the service request is passed back to the network managing agent (which is therefore unable to provide the service).

Where one re more of the following resources is not a dead end (step 676), the initial resource selects a following resource so as to define a path through the network. The selection may simply proceed on the basis of the first resource listed (e.g. R2 in this case). The service request is then passed to this next resource in step 682, but now including the details of the first resource R1.

The next resource R2 then begins execution at step 660, and the process continues, adding successive resources sequentially in a list defining the path through the network, until the list includes R3 and R10 in the correct order and terminals at resource R9.

At this point, at step 664, it will be observed that the service request is complete since the signal has arrived in the correct format at R9 where it can be delivered to terminal T1. Accordingly, at this point the resource R9 sends the completed service request back to the network managing agent (step 666) and awaits its response.

Referring back to FIG. 13b, in step 636 the network managing agent receives the completed service request, adds up the price elements added by each resource and compares then with the agreed price recorded in the price field 516.

The network managing agent may also determine a likely level of distortion by adding up progressive increments of distortion for each resource in the list of resources in the fields 530, and may derive a total delivery time by adding up the time delays associated with each resource in the list of resources in the fields 530, and compares these with the target delivery time in field 518 and distortion in field 520.

If each such comparison is acceptable (step 637), the network managing agent signals acceptance in step 638 to the resource agents in the list of resource agents in the completed service request, each of which then executes step 670 of FIG. 14 to configure issue command signals causing the corresponding physical network structure to connect the call.

In step 640, the network managing agent signals to the customer agent for the destination customer to expect the message in the stated format at the stated terminal specified in field 514 (this message may be delivered as a voice announcement to the destination user's mobile phone or a pager message to his pager).

In step 642, the network managing agent compares the cost calcualted in step 637 with the quoted price in field 516 and, in step 644, the network managing agent updates it pricing algorithm in accordance with the differences, as will be discussed in greater detail below.

If in step 637 the network managing agent determines that either the quality of the proposed service is unacceptable or the cost is too high, it returns to step 634 and transmits back the service request to the last resource agent (in this case R9).

This is interpreted (step 688) as a rejection of the resource request by resource agent R9, and accordingly R9 executes step 678 to pass the service request back to the immediately preceding resource agent in the list within the service request and deletes itself (and its price) from the list.

The preceding resource agent notes that it received the service request from R9 and accordingly does not attempt to forward the service request again to R9 but instead, if there is an alternative resource to which it is connected which is relevant (step 676) selects the next alternative resource in step 680.

It will thus be seen that FIGS. 13 and 14 together defined a depth-first tree-following algorithm which attempts to define a route through the resources and, where a particular route is unsuccessful, reverse back to the preceding node of the tree and attempt to follow a different route.

In practice, at step 676, each resource agent could determine additional tests; for example, the resource agents could each test the cumulative delay time associated with the list of resources recorded in the field 530, and/or the cumulative sum of all the distortion measurements therein, and when this exceeds the delivery time and distortion amounts specified in fields 518 and 520, there is then no further point in traversing the remainder of the path and step 678 may be executed immediately, to reverse back to the preceding resource agent and attempt to find a new path on from there.

Rather than merely following a path from the signal source P1, it is equally possible to attempt to construct a path from both the signal source P1 and the destination terminal T1 simultaneously, so as to reduce the path search time.

Terminal and Route Selection (Steps 624 and 626)

Figure 16B:
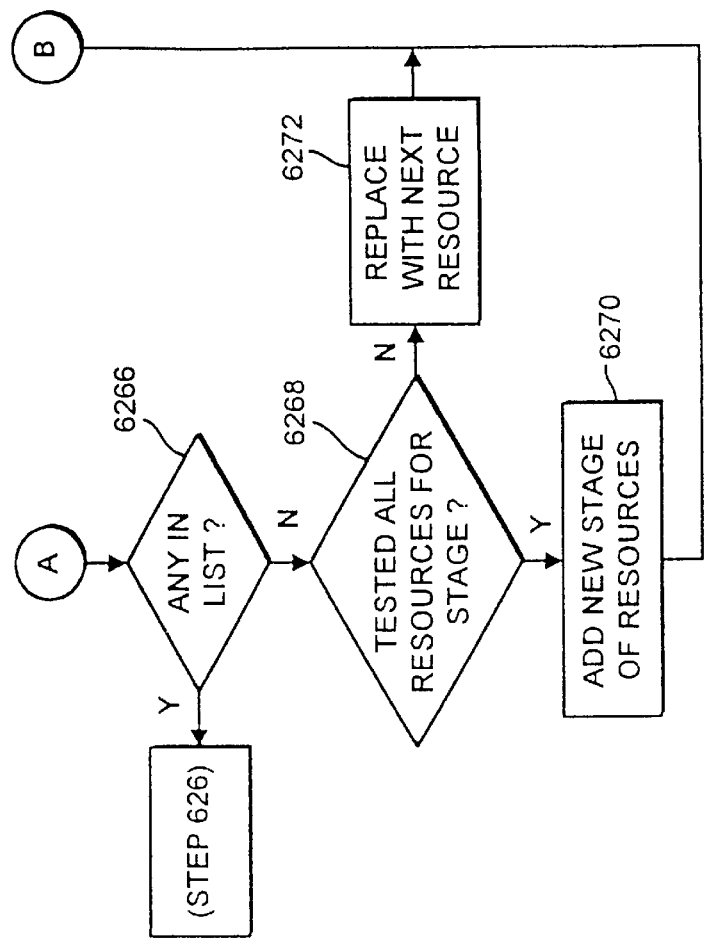
FIG. 16 (comprising FIGS. 16a and 16b) is a flow diagram showing schematically, in greater detail, the process of selection of a route to a terminal forming part of the process of FIG. 13.
Figure 16A:
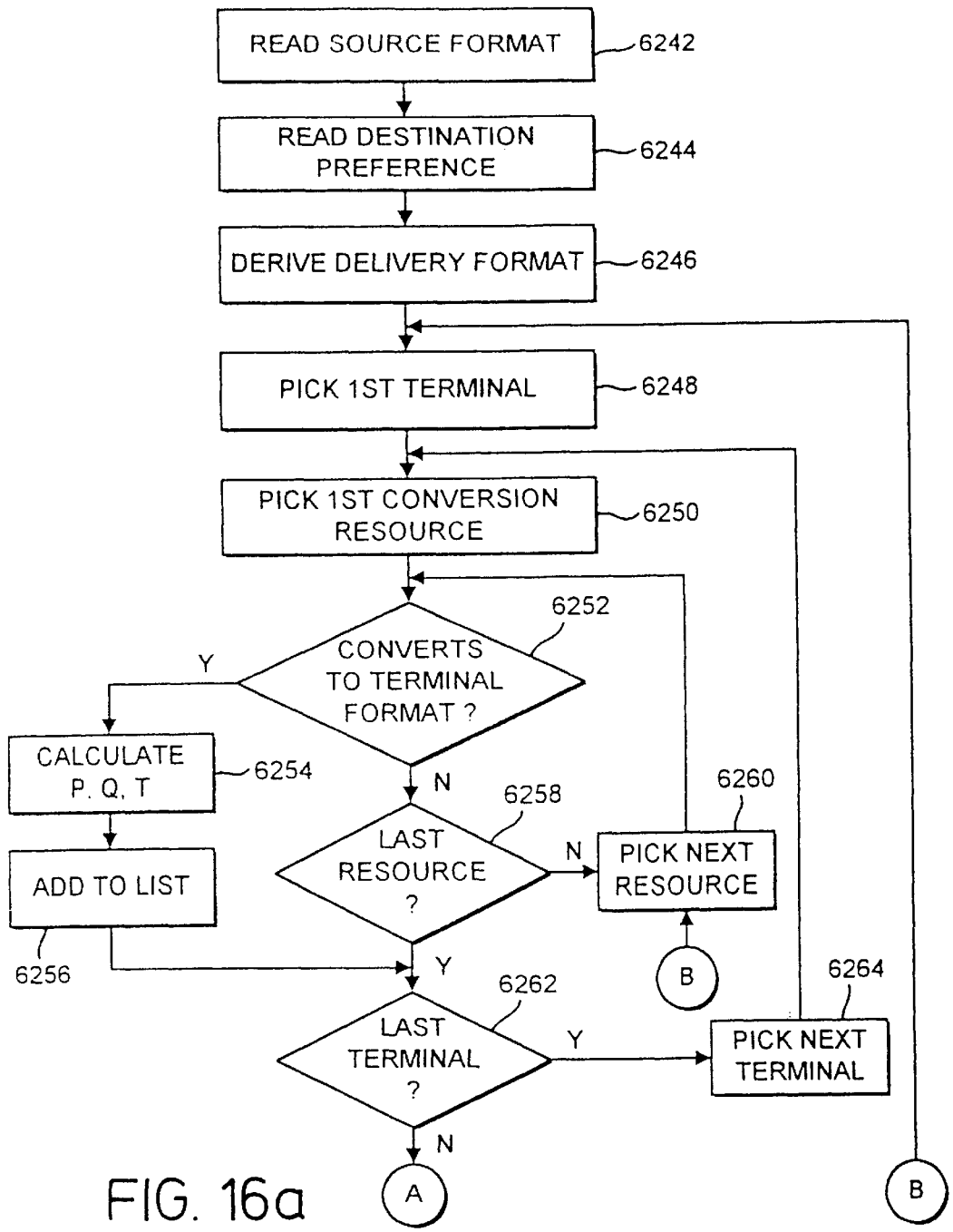

The process of selection of delivery terminal and format conversion described briefly above in relation to steps 624 and 626 will now be described in greater detail with reference to FIG. 16.

In step 6242, the network managing agent reads the source format field 506 from the service request and in step 6244 the network managing agent reads any delivery preference format data from the customer agent for the destination user; such information may, for example, specify that an incoming facsimile signal is to be delivered as an image signal or vice versa.

From the source format and the delivery format data (if any), in steps 6246, the network managing agent devices a preferred delivery format.

Next, the network managing agent determines, for each terminal reported to be adjacent to the designation user, whether the network includes a resource (a converter or a transparent link) which can convert between the source format and a format recognisable by the terminal. Accordingly, in step 6248, a first terminal is picked (this may be the terminal closest to the user) and in step 6250 a first conversion resource is picked.

In step 6252, the input and output formats required by the conversion resource (which may, as mentioned above, be identical where the resource is a transport resource) are compared with the source format and the list of formats which the terminal can accept. If they match, the stored price, distortion and time delay data (P, Q, T) for the resource are derived (step 6254) and the resource is added to a list of possible paths (step 6256).

If the converter input and output formats do not match the source format and or one of the formats the terminal can accept, and if not all resources have yet been tried (step 6258), the next conversion resource is substituted in step 6260 and the process is repeated. Once all conversion resources have ben attempted using the first such terminal in the area of the user, then if the last terminal has not yet been tried (step 6262), the next terminal is picked and the cycle is repeated.

Once all resources have been matched against all terminals (step 6262) if in step 6256 any possible delivery routes have been added to the list (step 6266), step 626 is executed. Specifically, if there is more than one route the network managing agent selects one of the routes by examining the price, delivery time and distortions calcualted (step 6254) and comparing these against the price, delivery time and distortion values filled in fields 516, 518 and 520 (if any) by the originating customer agent, and (if any) by the destination customer agent.

If multiple different routes in the list meet all these criteria, the network managing agents selects one, on the basis of price, quality or delivery time, or on the basis of awaited combination of these three. This forms the basis of the bid output in step 630.

If, after this first pass, no single resource suffices to convert the signal from the source format to a format which one of the designation terminals can support (step 6268), then a further pass is executed to determine whether a combination of two successive resources will convert the source format to one which a terminal can recognise (e.g. fax to text, followed by text to speech). This is achieved by setting a first conversion resource following the source format to convert it into a converted format, and then testing all other resources to determine whether any of them can convert the converted format into a format which can be recognised by one of the designation terminals.

Accordingly, in step 6270, a resource is added as an extra conversion stage to the source format (or any conversion resource which follows it). The selected resource must, of course, be able to convert the format on which acts (the source format or a converted format produced by a preceding stage), and must convert this to a different format (i.e. must not be a transport link).

After having added the extra stage (step 6270) a first terminal is selected (step 6248) and the first pass is repeated. If this first resource, when followed by any other resource, still does not lead to an acceptable path (step 6266), it is substituted by another resource (step 6270).

When all such resources have been tested as a first stage, and no successful two stage conversion process has been identified (step 6268), one resource is retained in the first stage and a further resource is added as a second stage, and the process is repeated to test for the presence of three stage conversions. If this too is unsuccessful, a further stage is added, and so on until ether a successful result is achieved, or another network managing agent is successful, or a time-out is reached.

Thus, the process corresponds to a breadth-first tree search, searching for the shortest solution first.

On transmission of a service request by a first network managing agent, all network managing agents halt the search for paths pending the acceptance or otherwise from the customer agent. If the service is rejected, the network managing agents therefore recommence searching for conversion paths where they left off.

Pricing

The pricing performed by the network managing agent in step 630 may be performed in one of two ways.

Firstly, where the service type is common (for example a voice called to be delivered to a voice terminal), the network managing agent may simply maintain a stored price for each such commonly called type, or several prices relating to different times of day (corresponding to lesser or greater load on the network) and may simply output the relevant price for the time of day.

On the other hand, where the service is less common and the network managing agent proposes to deliver the service by a succession of signal format conversions provided by corresponding resources, the network managing agent is arranged to read a stored price for each resource (or, as discussed above, a number of different prices for different times of day) and add the prices for the various resources to derive a total.

Each resource agent likewise issues a pricing signal at step 662. This is a function of a stored constant and the current utilisation factor (in other words, the percentage of the capacity of the resource which is current free, if any). The function may simply be A/C, where A is a constant and C is the percentage spare capacity. Thus, when the resource is under utilised (i.e. the spare capacity is close to 100%) the price tends to the value of the constant A, whereas when there is little spare capacity, the price rises sharply.

Price Updating

At steps 644, 646 and 672 the network managing agent and the resource agent update their prices. On each occasion when a resource agent is selected, it examines the ratio of the number of occasions on which it has been selected to the number of occasions on which it has bid and compares this with a predetermined constant K.

In the event that the ratio exceeds the predetermined constant K (i.e. the resource agent is begin selected relatively frequently), the stored constant A is increased by an amount which may ether be a fixed increment or a function of the different between the ratio and the predetermined constant K.

Likewise, when the ratio falls below the predetermined constant this indicates that the resource is being selected relatively infrequently and the stored constant A is decremented (by a fixed amount or a function of the difference between the ratio and the predetermined constant K).

Naturally, other procedures for adjusting the price depending upon the relative frequency of selection of the resource could be utilised.

In step 644, the network managing agent is able to update more accurately its model of the costs which will be charged each resource agent, by comparing the prices listed in the route fields 530 with those it currently has stored for resources of the same type; for example, where the path includes five leased line links, the network managing agent may calculate the average of the five and store this as a new price datum for resources of the fixed leased line type (or combine it with the existing stored measurement to maintain a running average price).

Naturally, these stored constant cost levels will affect future prices calculated by the network managing agent for services assembled from a plurality of conversion resources.

Additionally, the network managing agent adapts its price level in the same manner as each resource agent to depend upon the relative ratio of the number of times it has been selected to the number of time it has bid (in steps 646).

The extension of the above described processes to a more hierarchical arrangement, where entities may act as a network managing act to resources below them and as a resource to further network managing agents above them, will be apparent to the skilled person.

Separate Networks

In the foregoing, the behaviour of network managing agents in pricing services utilising resources within their own network has been described.

However, it will sometimes be necessary for a network managing agent to delivery services utilising another network (for example, utilising a pager network to deliver a message to a pager or a long distance carrier to carry a transatlantic message).

Accordingly, the network managing agent also stores records, corresponding to those of the resources within its associated network, for each other network, and stores a predetermined price constant for each such other network.

The network managing agent then adds the detail of the other network within the path fields 530 of the service request before transmitting the service request to its own resource agents, so that the resource agents bid only for that portion of the path which lies through the network associated with the network managing agent concerned.

Structure of Each Agent

To some extent, the structure of the agents may be made compatible so as to increase the ease with which they may integrated into a hierarchy, and increase the possibilities for re-use of the same program code.

Accordingly, each agent may be regarded as being comprised of code defining a buying function (this is, of course, not necessary for the resource agents) and a selling function (this is, of course, not necessary for the customer agents)

together with a communications function (for signalling either between different programs executing on the same processor in time sharing mode, or for signalling across network signalling channels between processors).

Further, the data held in relation to the capabilities of each terminal may be held in object oriented form, as a terminal object, or as a "terminal agnet". Where the terminal contains computer processing equipment, the terminal agent program may reside on the terminal and communicate changes to the capabilities of the program via the communications network. The terminal agent may, in this case, be downloaded to the terminal on first connection of the terminal to the network.

Summary

It will be seen that the particular manner of operation of the agents in this embodiment is advantageous in several respects. Firstly, it will be observed that in general the number of agents simultaneously communicating with each other is kept low; this advantageous since it enable the size of the network to be increased without the inter-agent messages swamping the network. With ten million users or more, this is a very real risk.

Secondly, the behavior of each agent may be relatively simple.

Thirdly, since network managing agents bid prices in a first pass of operation, before making a detailed investigation of the availability or price of the services in a more detailed second pass, relatively few agents are active during each stage of operation (in the first pass, all the network managing agents are active, whereas in the second pass, only the resource agents of the successful network managing agents are active). This conserves computing and signalling resources further.

Other Aspects of the Invention

Terminals

Particular terminals have been discussed above as examples. A more complete (though non limiting) list would include:

telephones,
video cameras,
3D displays,
personal digital assistants,
cellular telephones,
satellite telephones,
pagers,
video phones,
facsimiles,
payphones,
quertyphones,
personal computers,
lap top portable computers,
engineering workstations,
audio microphones,
video conference suites,
telemetry equipment.

Network and Links

Likewise, although examples of networks have ben given the range of networks links available includes:

terrestrial cellular networks (analog or digital),
callpoint wireless systems,
microcellular or picocellular systems,
satellite cellular systems,
the Internet,
packet switching data services (PSS),
leased lines,
the PSTN,
optical networks,
Ethernet or the like area networks,
line of sight infrared links,
line of sight infrared links,
video to home links,
radio paging networks.

User Location

Whilst Particular techniques for location tracking have been described, it will of course be understood that any method of tracking the approximate user position may be used; for example, tracking the terminals at which a user logs on. Accordingly, no specific position tracking device is essential to the invention.

Pricing and Charging

It will be understood that the prices accepted by the customer agent may correspond to prices actually to be paid by the customer. Equally, the price charged by one network resource may reflect an actual financial transaction within the network or between two networks. However, it is equally possible for the price mechanism to operate simply as a routing procedure, without implications for the actual prices paid by the user or any part of any network.

Naturally, many other modifications and variations may be made the above described embodiments without departing from the invention.

What is claimed is:

1. A telecommunications apparatus comprising:
   means for selecting and rouging a signal destined for a user to one of a plurality of different terminals, operating in accordance with different signal formats,
   the selecting means comprising:
      a user tracking system, for maintaining a record of the position of the user; and
      a terminal capability store for storing, for said terminals, records of the signal format or formats with which each of said terminals can operate, means for detecting the format of an incoming signal, and comparing ti with formats with which said terminals can operate,
   wherein the selecting means is for selecting one of said terminals, based jointly upon its location relative to the user, and upon the extent to which the format with which it can operate can represent the incoming signal.

2. Apparatus as in clam 1, in which the user tracking system comprises:
   a hierarchical database including a first layer comprising:
      a first plurality of first user record stores corresponding to respective first localised areas and each storing location data relating to users in a respective said area, and
      a second layer comprising at least one second user record store corresponding to a second area including a plurality of said first areas and storing location data relating to users in said second area.

3. Apparatus as in claim 2, in which the data stored in each said second user record store comprises, for each user in said second area, a pointer to the respective first user record store within the first localised area of which said user is located.

4. Apparatus as in claim 2 in which each second user record store comprises a home record store and each user in uniquely allocated to a single said second user record store.

5. Apparatus as in claim 2 in which said first user record stores are arranged also to provide said terminal capability store for terminals located within the corresponding said first localised areas.

6. Apparatus as in claim 5, in which the said first user record stores are arranged to store geographical position data defining the positions of said terminals.

7. Apparatus as in claim 1 in which said record of the position of the user comprises a record of which terminal the user is using.

8. Apparatus as in claim 1 in which said record of the position of the user comprises a record of the geographical position of the user.

9. Apparatus as in claim 2 in which the first record stores are located close to or within their respective first areas, and are connected to the second record stores via a signalling channel.

10. Apparatus as in claim 1 further comprising format conversion means, for converting between plural different signal formats, and arranged to route said signal via said format conversion means.

11. Apparatus as in clam 10, in which said format converting means is arranged to convert between formats corresponding to different media.

12. Apparatus as in claim 10 in which said format converting means is arranged to convert a signal in a first format to a second format in which it is represented by a lower volume of data.

13. Apparatus as in claim 12 in which the selecting and routing means is capable of routing said signal to a first terminal relatively close to the user in a first format or to a second terminal further away from the user in a second format retaining more of the information content of the signal.

14. Apparatus as in clam 13 in which the selecting and routing means is arranged preferentially to route the signal to the second terminal.

15. A method of delivering a telecommunications signal to a telecommunications user comprising:
   tracking said user;
   assessing the reproduction capabilities of a plurality of different telecommunication terminals in the vicinity of said user; and
   delivering said message to one of said terminals in the vicinity of said user in dependence upon the format of said signal, the capabilities of said terminals and the position of said user.

16. A method as in claim 15 further comprising:
   signalling the destination terminal to said user via a different terminal closer to said user.

17. A method of communications with a user, said method comprising:
   (i) assessing stored data relating to geographical positions of a plurality of terminals;
   (ii) determining the geographical location of the user;
   (iii) comparing the geographical position of at least one of the plurality of terminals with the geographical location of the user; and
   (iv) providing communications based upon the relationship between the location of the user and the positions of the terminals.

18. A telecommunications method comprising:
   selecting and rouging a signal destened for a user to one of a plurality of different terminals, operating in accordance with different signal formats,
   the selecting step comprising:
   maintaining a record of the position of the user; and
   storing, for said terminals, records of the signal format or formats with which each of said terminals can operate, detecting the format of an incoming signal, and comparing it with formats with which said terminals can operate,
   wherein the selecting step selects one of said terminals, based jointly upon its location relative to the user, and upon the extent to which the format with which it can operate can represent the incoming signal.

19. A method as in claim 18 in which the records maintained for users comprises:
   a hierarchical database including a first layer comprising:
      a first plurality of first user records corresponding to respective first localised areas and each storing location data relating to users in a respective said area, and
      a second layer comprising at least one second user record corresponding to a second area including a plurality of said first areas and storing location data relating to users in said second area.

20. A method as in claim 19 in which the data stored in each said second user record comprises, for each user in said second area, a pointer to the respective first user record within the first localised area of which said user is located.

21. A method as in claim 19 in which each second user record comprises a home record and each user is uniquely allocated to a single said second user record.

22. A method as in claim 19 in which said first user records are arranged also to provide said terminal capability store for terminals located within the corresponding said first localised areas.

23. A method as in claim 22 in which the first user records are arranged to store geographical position data defining the positions of said terminals.

24. A method as in claim 18 in which said record of the position of the user comprises a record of which terminal the user is using.

25. A method as in claim 18 in which said record of the position of the user comprises a record of the geographical position of the user.

26. A method as in claim 19 in which the first records are located close to or within their respective first areas, and are connected to the second records via a signalling channel.

27. A method as in claim 18 further comprising converting between plural different signal formats, and routing said signal via said format conversion step.

28. A method as in claim 27 in which said format converting step is arranged to convert between formats corresponding to different media.

29. A method as in claim 27 in which said format converting step is arranged to convert a signal in a first format to a second format in which it is represented by a lower volume of data.

30. A method as in claim 29 in which the selecting and routing steps are capable of routing said signal to a first terminal relatively close to the user in a first format or to a second terminal further away from the user in a second format retaining more of the information content of the signal.

31. A method as in claim 30 in which the selecting and routing steps are arranged preferentially to route the signal to the second terminal.

32. Apparatus for delivering a telecommunications signal to a telecommunications user comprising:
   means for tracking said user;
   means for assessing the reproduction capabilities of a plurality of different telecommunication terminals in the vicinity of said user; and means for delivering said message to one of said terminals in the vicinity of said user in dependence upon the format of said signal, the capabilities of said terminals and the position of said user.

33. Apparatus as in claim 32 further comprising:

means for signalling the destination terminal to said user via a different terminal closer to said user.

34. Apparatus for effecting communications with a user, said apparatus comparing:

(i) means for accessing stored data relating to geographical positions of a plurality of terminals, (ii) means for determining the geographical location of the user;

(iii) means for comprising the geographical position of at least one of the plurality of terminals with the geographical location of the user; and (iv) means for providing communications based upon the relationship between the location of the user and the positions of the terminals.

* * * * *

UNITED STATES PATENT AND TRADEMARK OFFICE
CERTIFICATE OF CORRECTION

PATENT NO. : 6,167,122
DATED : December 26, 2000
INVENTOR(S) : Titmuss et al.

It is certified that error appears in the above-identified patent and that said Letters Patent is hereby corrected as shown below:

Column 20,
Line 33, change "rouging" to -- routing --;
Line 41, start a new paragraph between "operate" and "means";
Line 43, change "ti" to -- it --;
Line 65, change "user in" to -- user is --;

Column 21,
Line 53, change "assessing" to -- accessing --;
Line 63, change "rouging" to -- routing --;

Column 23,
Line 9, change "comparing" to -- comprising --; and

Column 24,
Line 3, change "comprising" to -- comparing --.

Signed and Sealed this

Eighteenth Day of December, 2001

Attest:

Attesting Officer

JAMES E. ROGAN
*Director of the United States Patent and Trademark Office*